(12) United States Patent
Masuda et al.

(10) Patent No.: US 11,115,740 B2
(45) Date of Patent: Sep. 7, 2021

(54) FLAT PANEL SPEAKER AND DISPLAY UNIT

(71) Applicant: Sony Corporation, Tokyo (JP)

(72) Inventors: Toshihiko Masuda, Tokyo (JP); Hiroki Matsuoka, Saitama (JP); Hideyuki Taguchi, Tokyo (JP); Hiroshi Yoshioka, Kanagawa (JP); Shinpei Kondo, Kanagawa (JP)

(73) Assignee: Sony Corporation

( * ) Notice: Subject to any disclaimer, the term of this patent is extended or adjusted under 35 U.S.C. 154(b) by 0 days.

(21) Appl. No.: 16/070,853

(22) PCT Filed: Nov. 15, 2017

(86) PCT No.: PCT/JP2017/041065
§ 371 (c)(1),
(2) Date: Jul. 18, 2018

(87) PCT Pub. No.: WO2018/123310
PCT Pub. Date: Jul. 5, 2018

(65) Prior Publication Data
US 2019/0028787 A1    Jan. 24, 2019

(30) Foreign Application Priority Data

Dec. 27, 2016  (JP) .............................. JP2016-253665
May 19, 2017  (JP) .............................. JP2017-099449

(51) Int. Cl.
*H04R 25/00*    (2006.01)
*H04R 1/02*    (2006.01)
(Continued)

(52) U.S. Cl.
CPC .............. *H04R 1/025* (2013.01); *H04R 7/04* (2013.01); *H04R 7/26* (2013.01); *H04R 9/025* (2013.01);
(Continued)

(58) Field of Classification Search
CPC ........... H04R 1/025; H04R 7/04; H04R 7/26; H04R 9/025; H04R 7/045; H04R 2440/05; H04R 2499/15
(Continued)

(56) References Cited

U.S. PATENT DOCUMENTS

2001/0043714 A1    11/2001    Asada et al.
2005/0147273 A1    7/2005    Azima et al.
(Continued)

FOREIGN PATENT DOCUMENTS

CN    1195454 A    10/1998
EP    0847661 B1    11/1999
(Continued)

OTHER PUBLICATIONS

Extended European Search Report and Written Opinion for EP Application No. 17887051.5, dated Mar. 4, 2019.
(Continued)

*Primary Examiner* — Phylesha Dabney
(74) *Attorney, Agent, or Firm* — Lerner, David, Littenberg, Krumholz & Mentlik, LLP

(57) ABSTRACT

A flat panel speaker according to an embodiment of the disclosure includes a flat panel and a plurality of vibrators that are disposed on a back surface of the flat panel. The plurality of vibrators are disposed to avoid a location that most easily vibrates in an entire range of audio frequencies when vibration is generated in the flat panel by the plurality of vibrators. A large stationary wave with respect to the flat panel therefore does not easily occur.

18 Claims, 22 Drawing Sheets

(51) Int. Cl.
    *H04R 7/04*      (2006.01)
    *H04R 9/02*      (2006.01)
    *H04R 7/26*      (2006.01)
    *G02F 1/1333*      (2006.01)

(52) U.S. Cl.
    CPC ........ *G02F 1/133394* (2021.01); *H04R 7/045* (2013.01); *H04R 2440/05* (2013.01); *H04R 2499/15* (2013.01)

(58) Field of Classification Search
    USPC ........................................................ 381/431
    See application file for complete search history.

(56) References Cited

U.S. PATENT DOCUMENTS

| | | |
|---|---|---|
| 2005/0147274 A1 | 7/2005 | Azima et al. |
| 2015/0341714 A1 | 11/2015 | Ahn et al. |
| 2016/0337758 A1 | 11/2016 | Kushima et al. |

FOREIGN PATENT DOCUMENTS

| | | |
|---|---|---|
| EP | 2884765 A1 | 6/2015 |
| JE | 2010081142 A | 4/2010 |
| JP | S50069527 U | 6/1975 |
| JP | S5588499 A | 7/1980 |
| JP | S6140099 U | 3/1986 |
| JP | 2002510182 A | 4/2002 |
| JP | 2004129115 A | 4/2004 |
| JP | 2005198342 A | 7/2005 |
| JP | 2006074597 A | 3/2006 |
| JP | 2007143010 A | 6/2007 |
| JP | 2009100223 A | 5/2009 |
| JP | 2009159104 A | 7/2009 |
| JP | 4317957 B2 | 8/2009 |
| JP | 2010081142 A | 4/2010 |
| JP | 2014072711 A | 4/2014 |
| JP | 2014123812 A | 7/2014 |
| JP | 2014127767 A | 7/2014 |
| JP | 2015219528 A | 12/2015 |
| WO | 97009842 A2 | 3/1997 |

OTHER PUBLICATIONS

Japanese Office Action for Application No. JP2019035155 dated Mar. 24, 2020; 4 pages.
Chinese Office Action with Search Report for Application No. 201780012260.2 dated Jul. 2, 2020, 11 pages.
International Search Report corresponding to PCT/JP2017/041065, dated Jan. 23, 2018, 3 pgs.

[ FIG. 1 ]
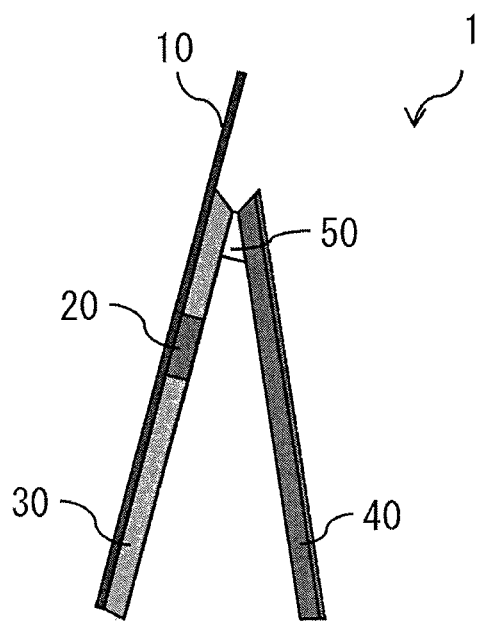
[ FIG. 2 ]
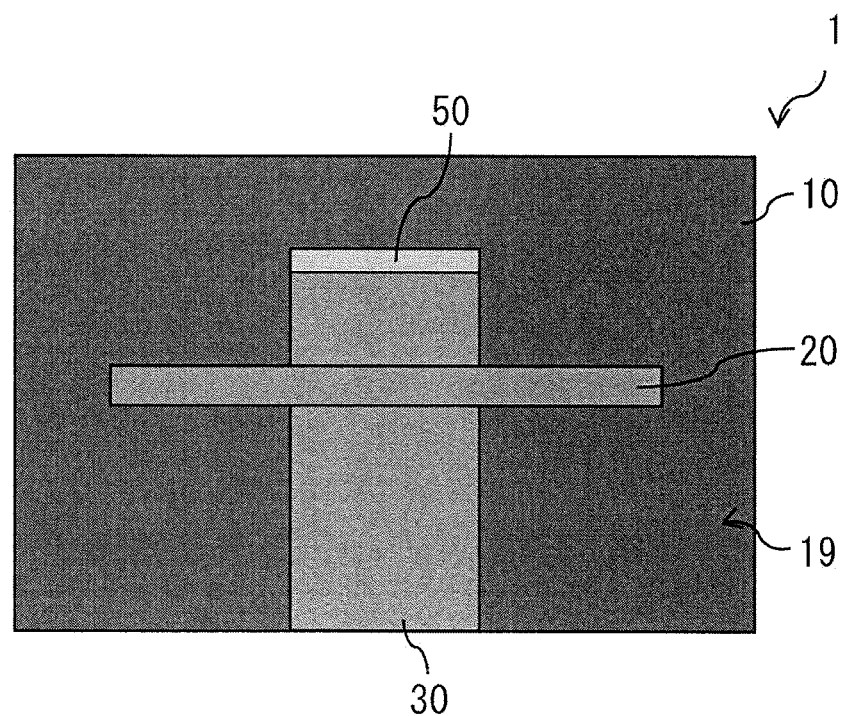

[ FIG. 3 ]
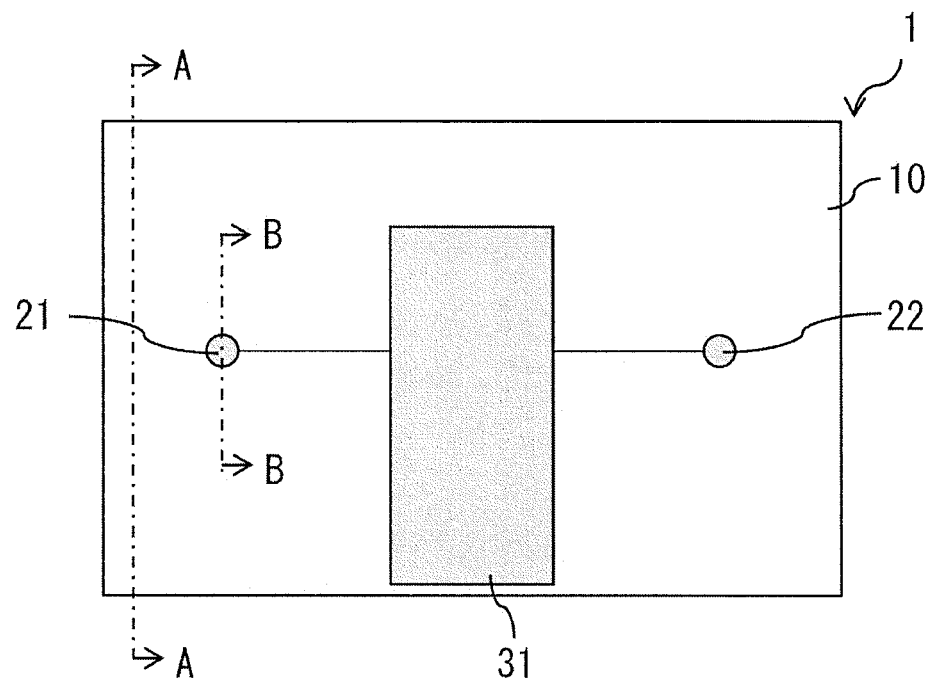
[ FIG. 4 ]
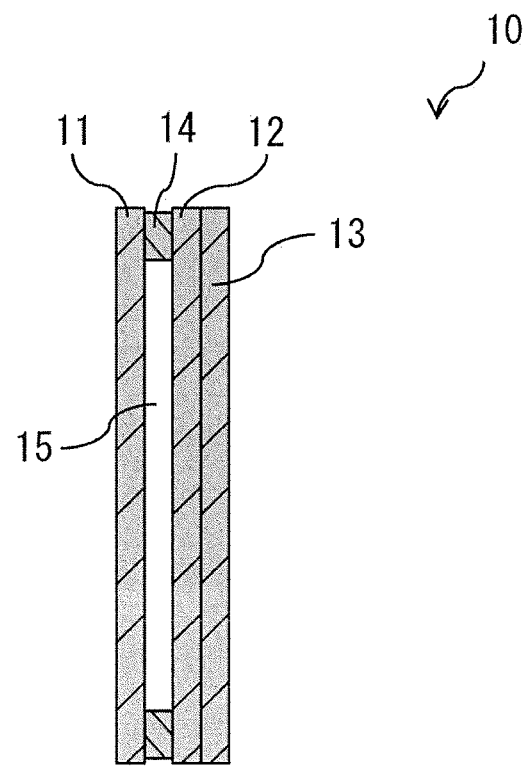

[ FIG. 5 ]
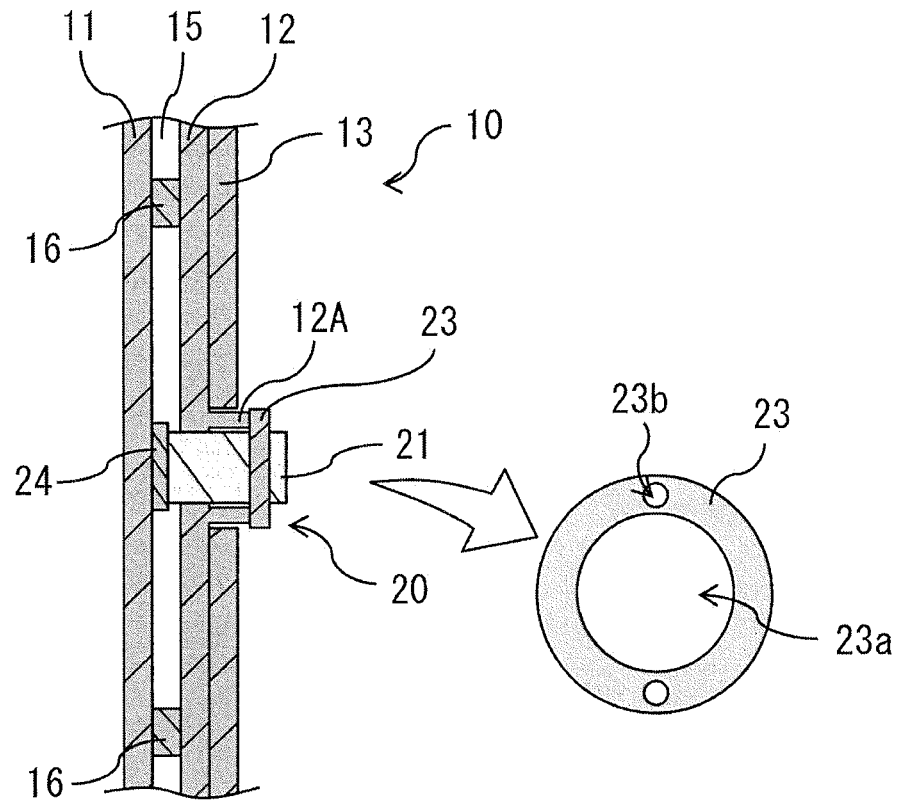
[ FIG. 6 ]
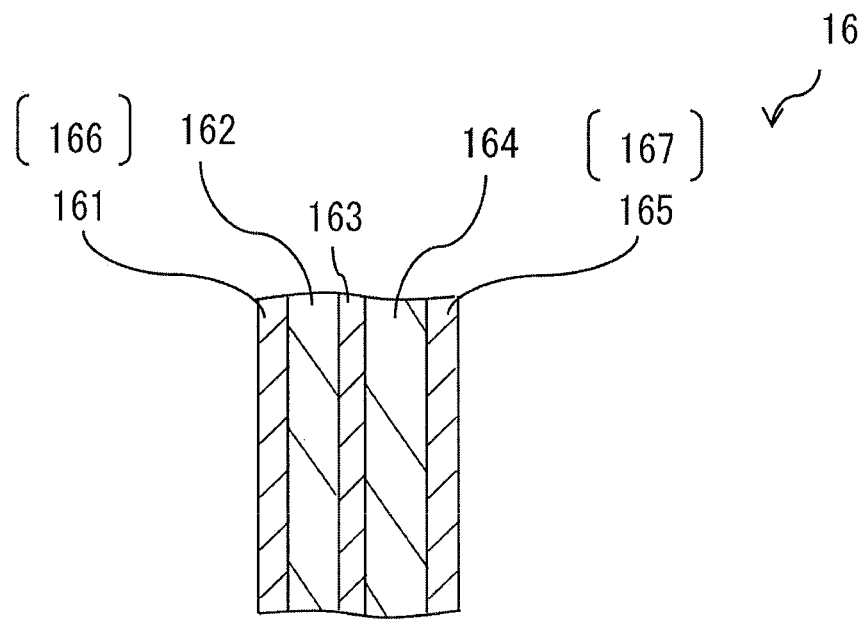

[ FIG. 7 ]
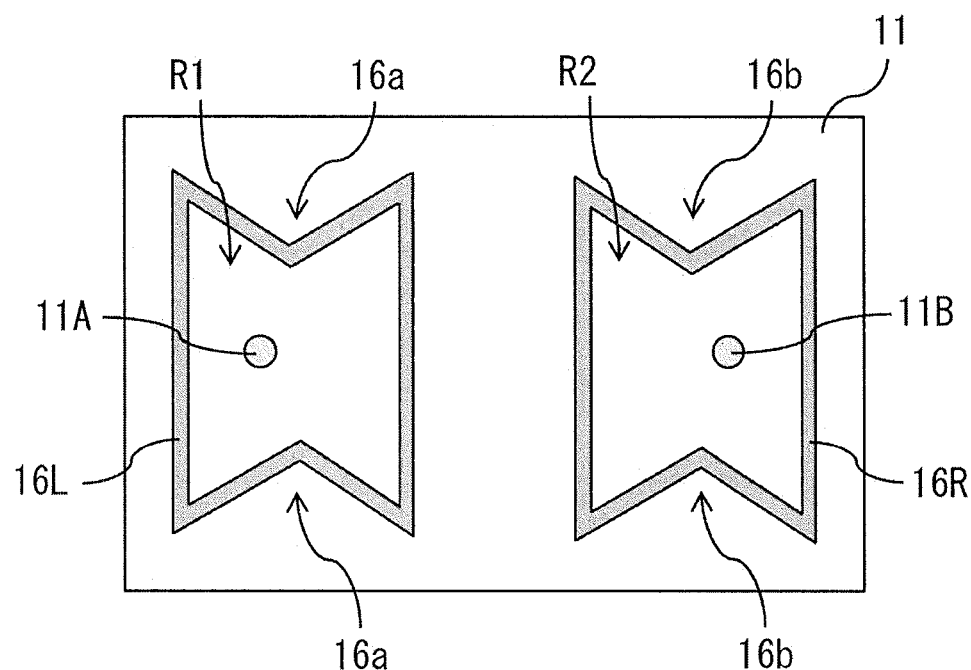
[ FIG. 8 ]
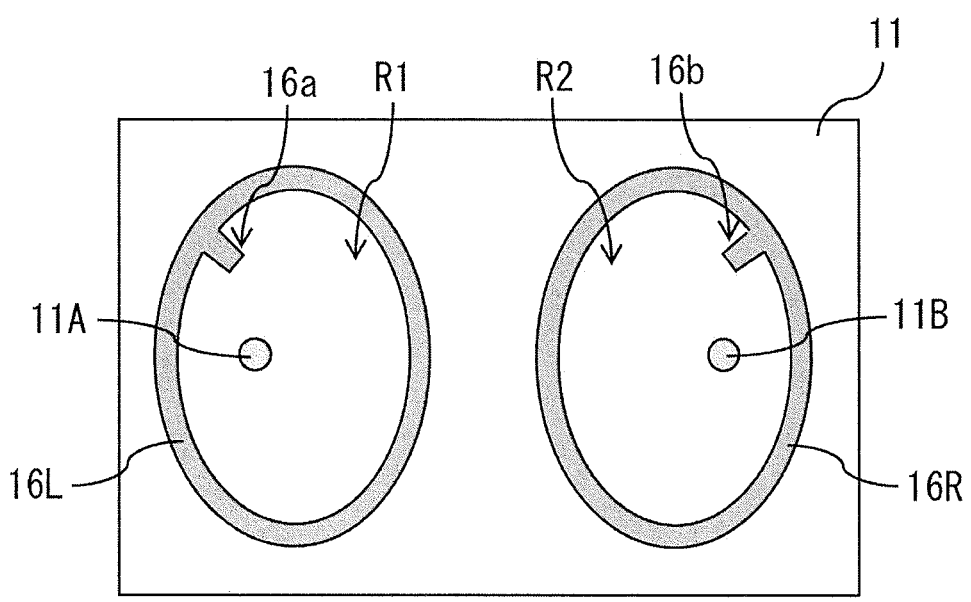

[ FIG. 9 ]
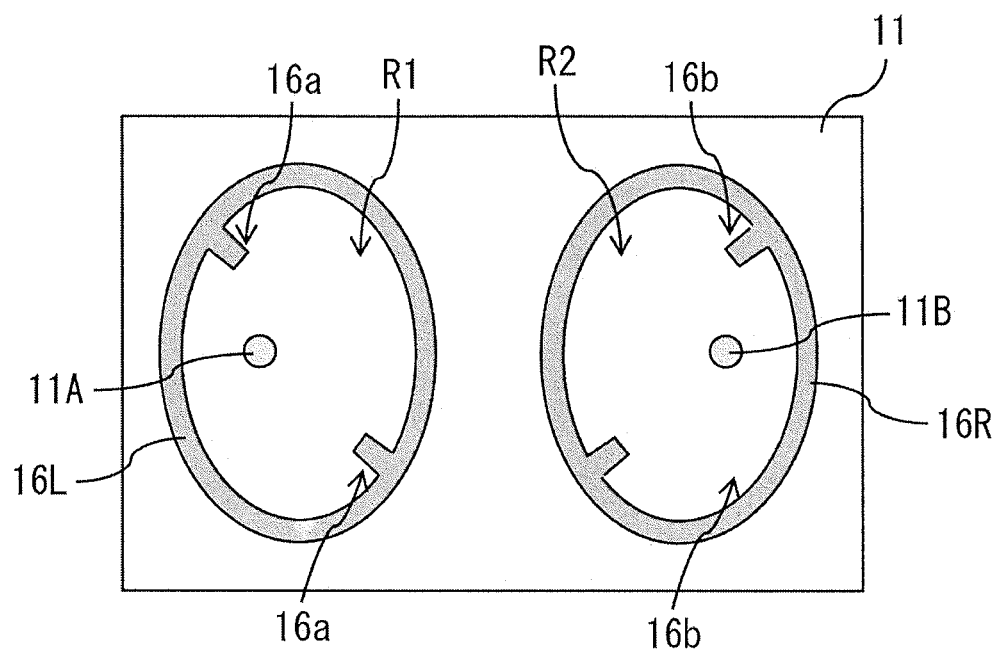
[ FIG. 10 ]
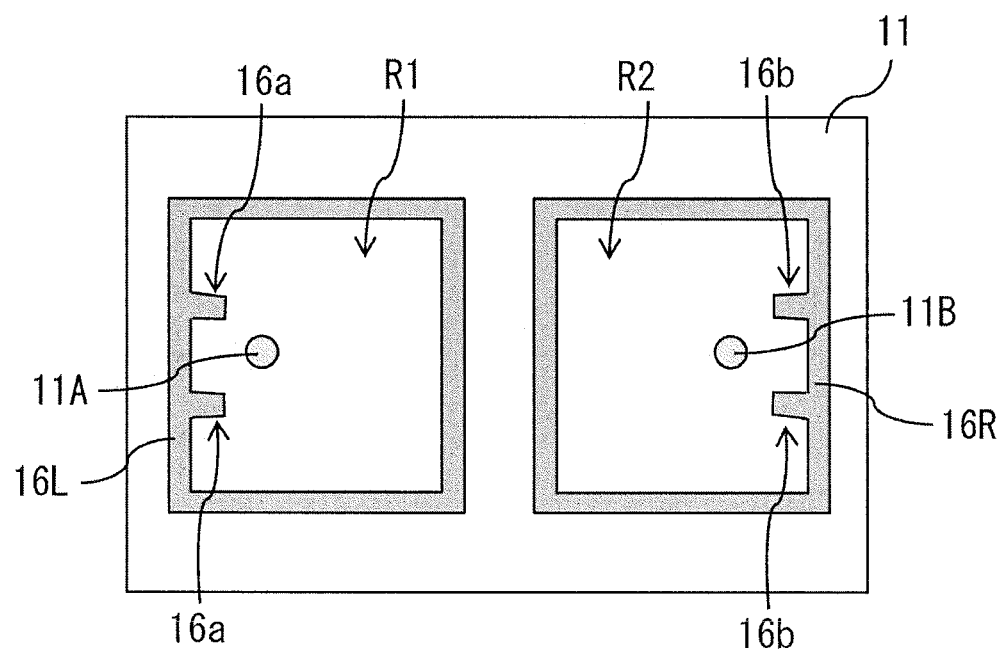

[ FIG. 11 ]
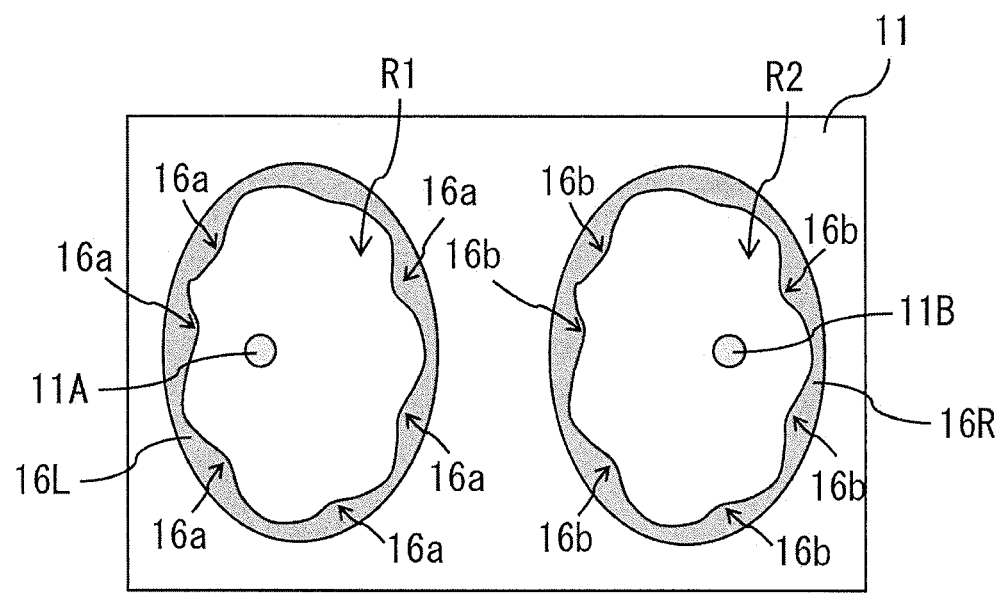
[ FIG. 12 ]
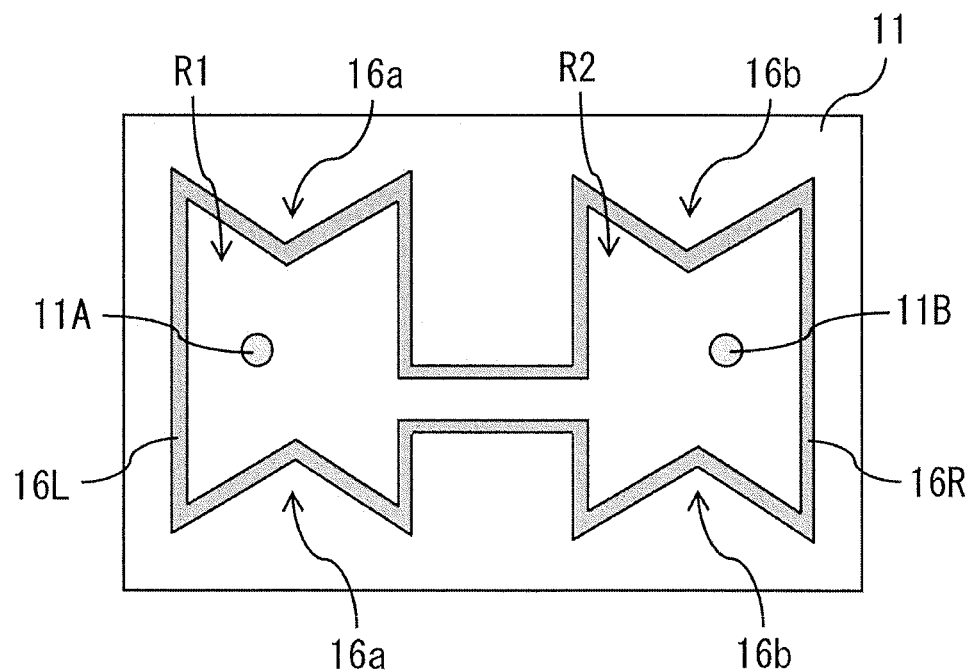

[ FIG. 13 ]
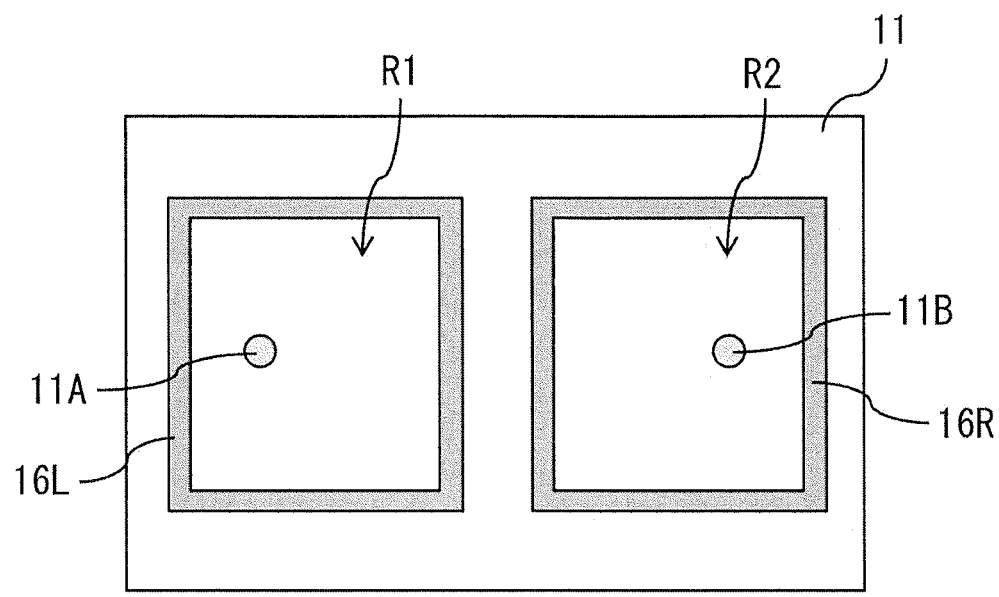
[ FIG. 14 ]
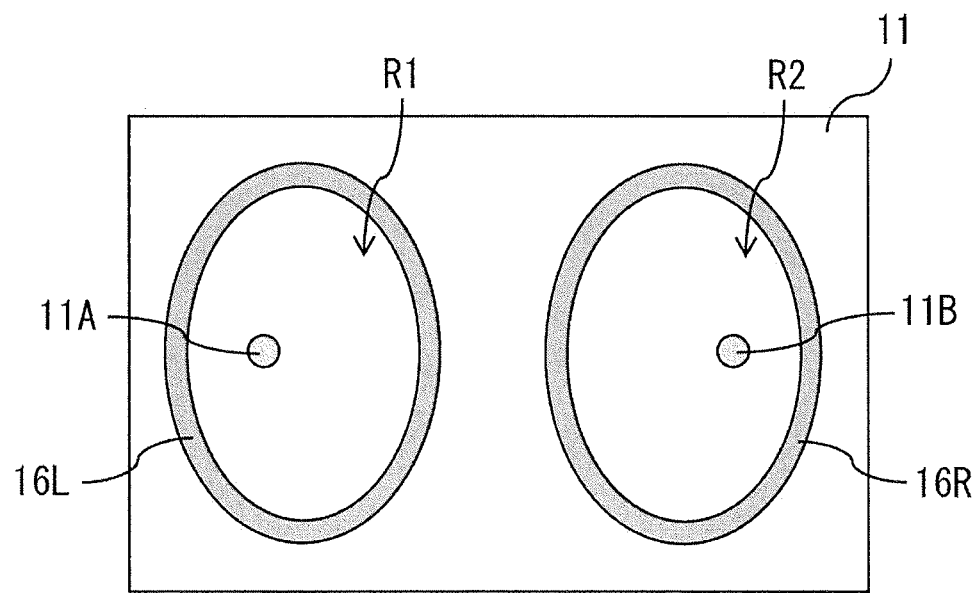

[ FIG. 15 ]
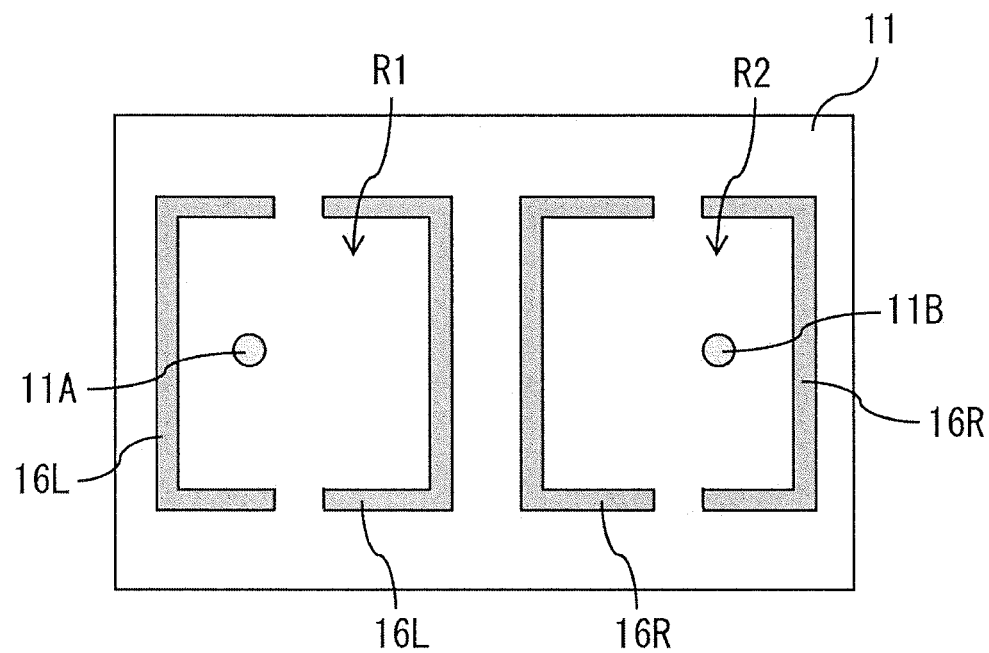
[ FIG. 16 ]
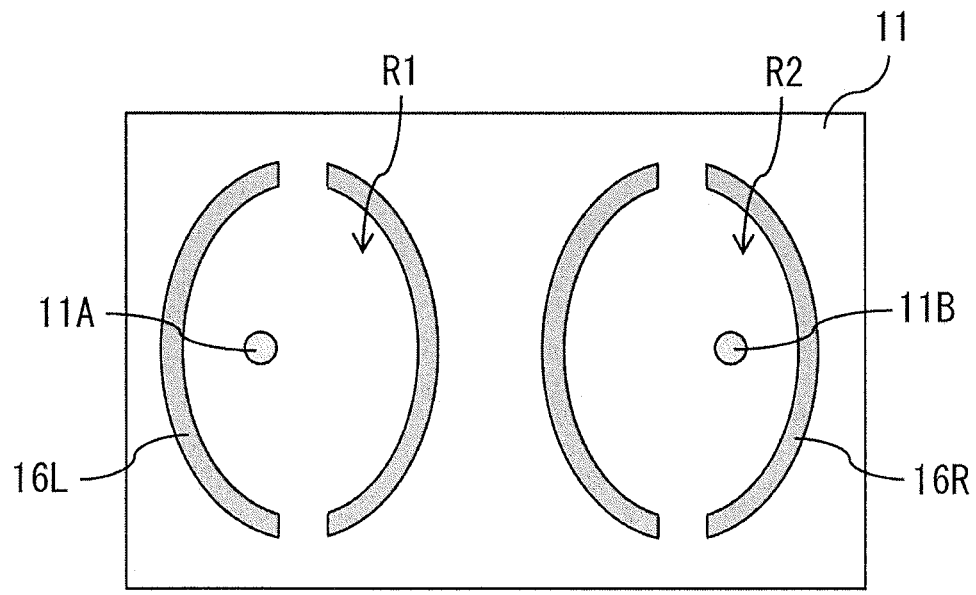

[ FIG. 17 ]
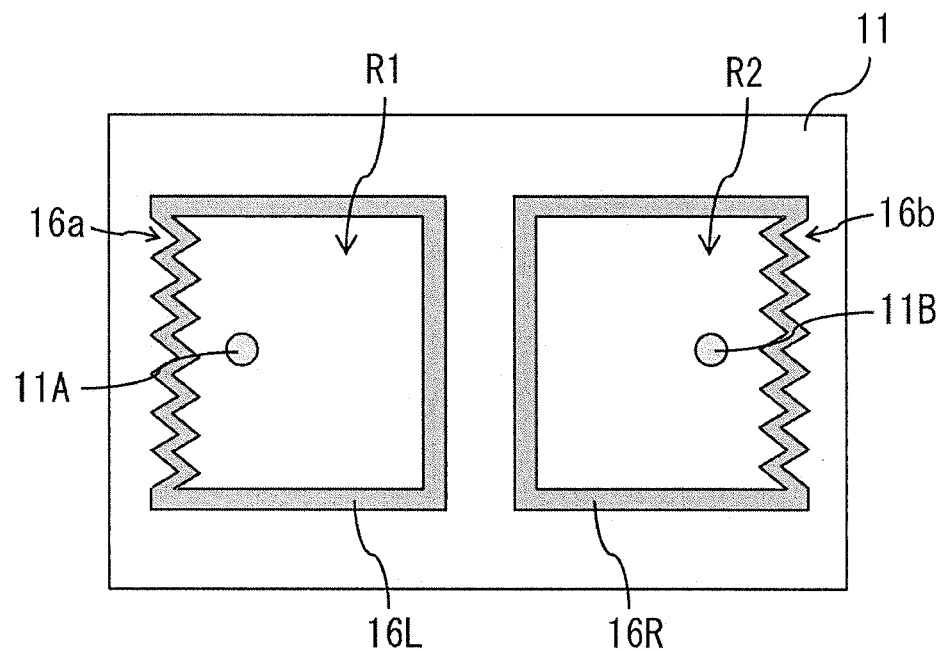
[ FIG. 18 ]
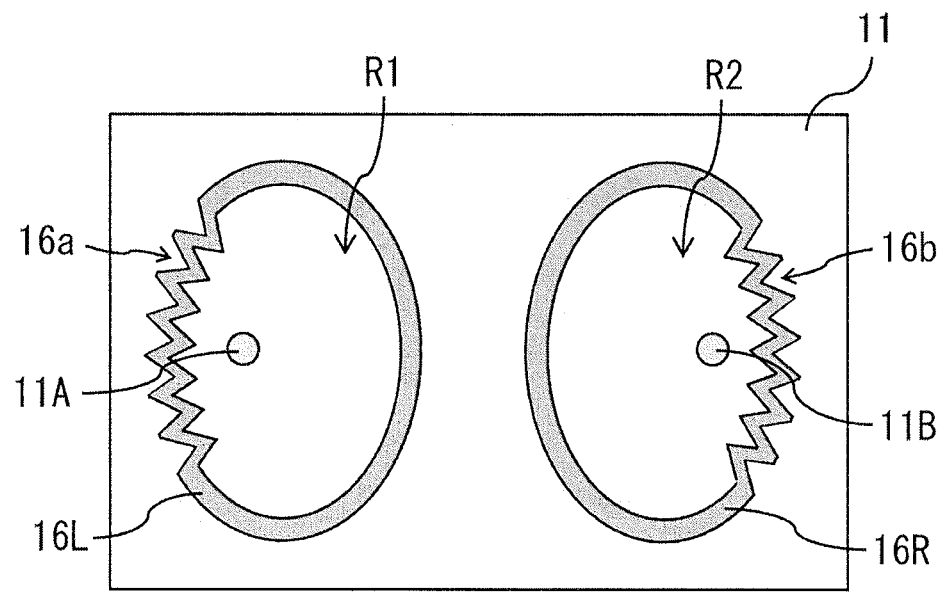

[ FIG. 19 ]
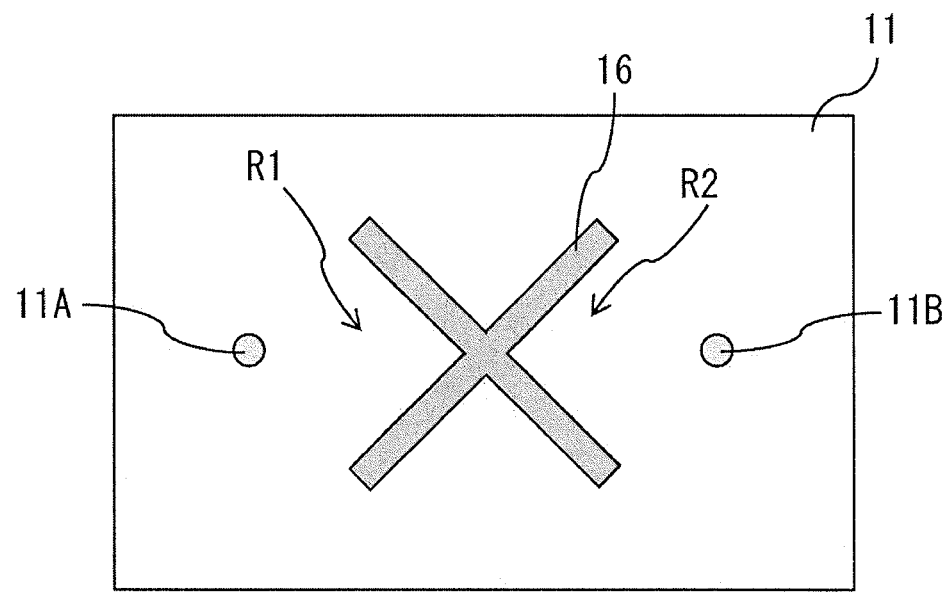
[ FIG. 20 ]
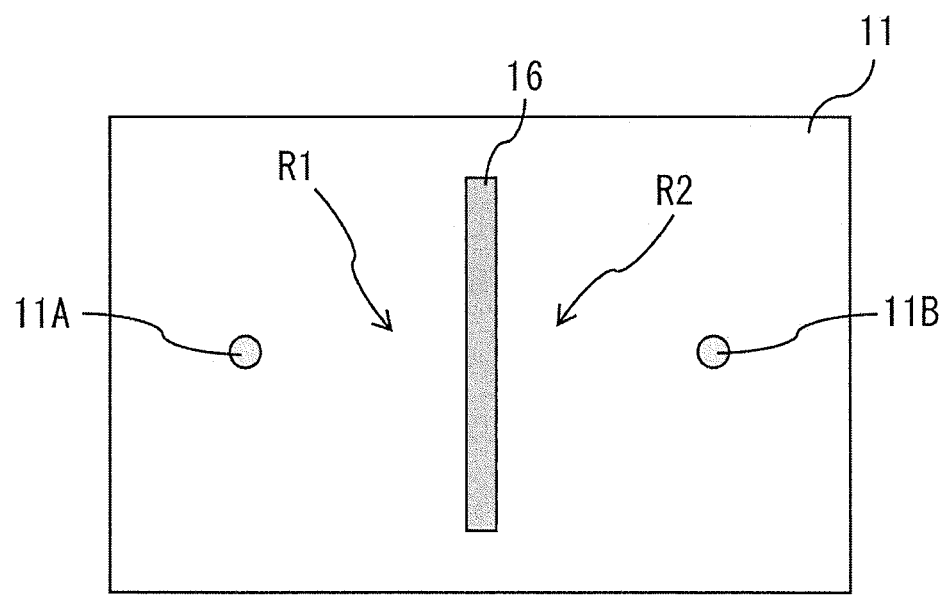

[ FIG. 21 ]
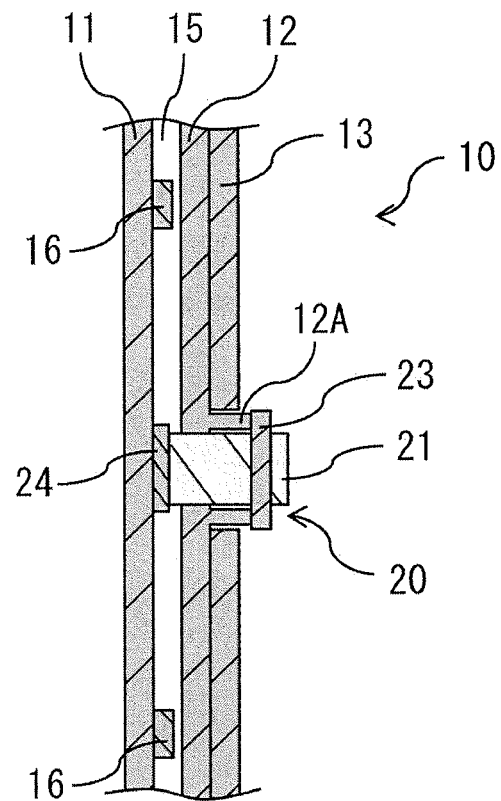
[ FIG. 22 ]
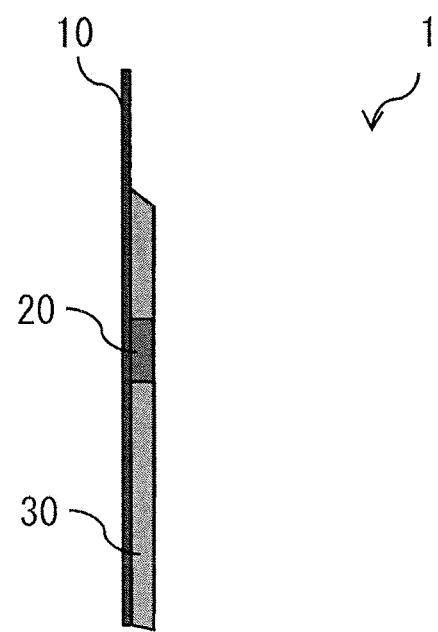

[ FIG. 23 ]
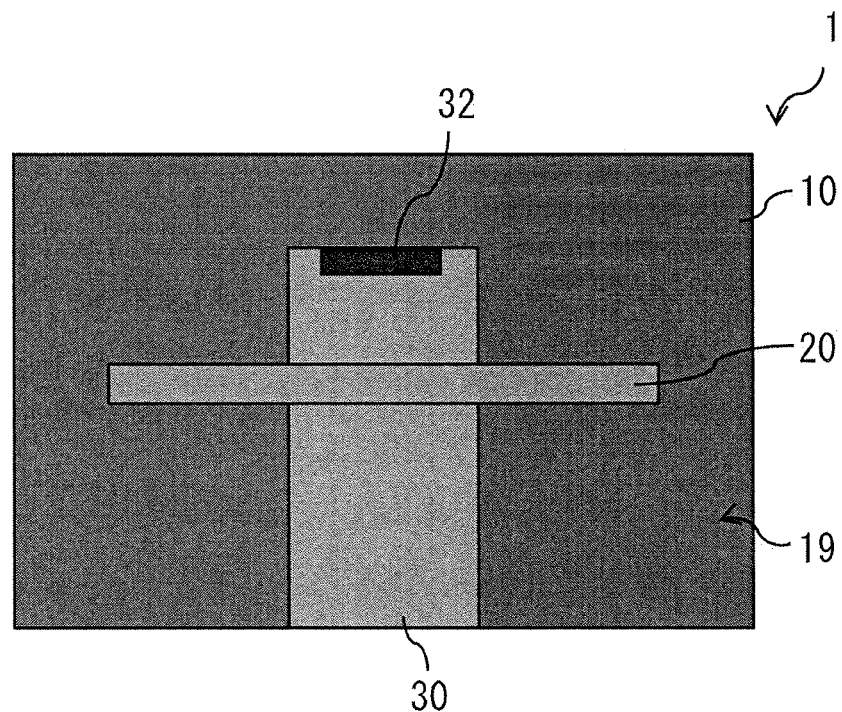
[ FIG. 24 ]
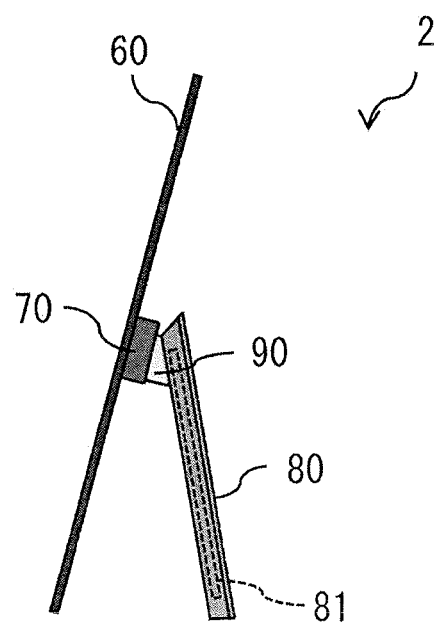

[ FIG. 25 ]
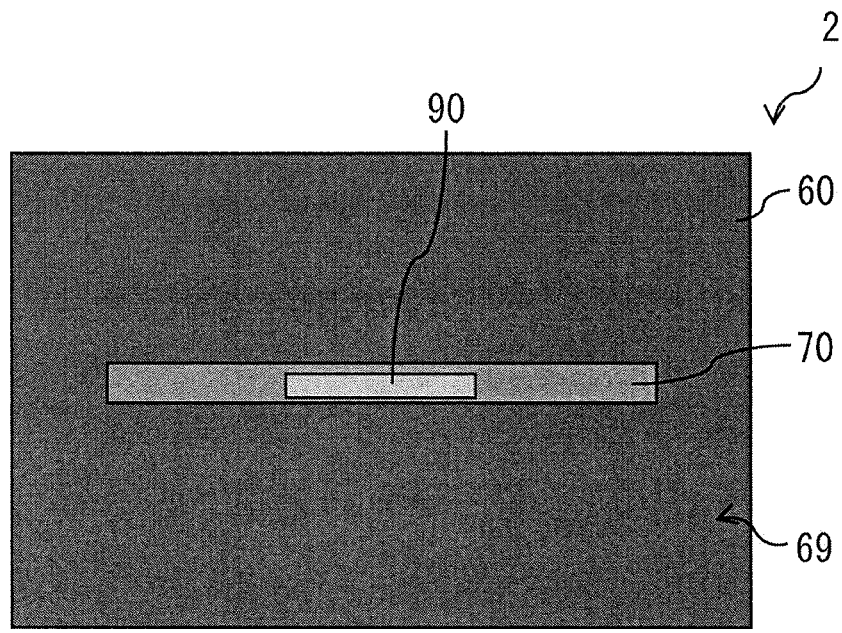
[ FIG. 26 ]
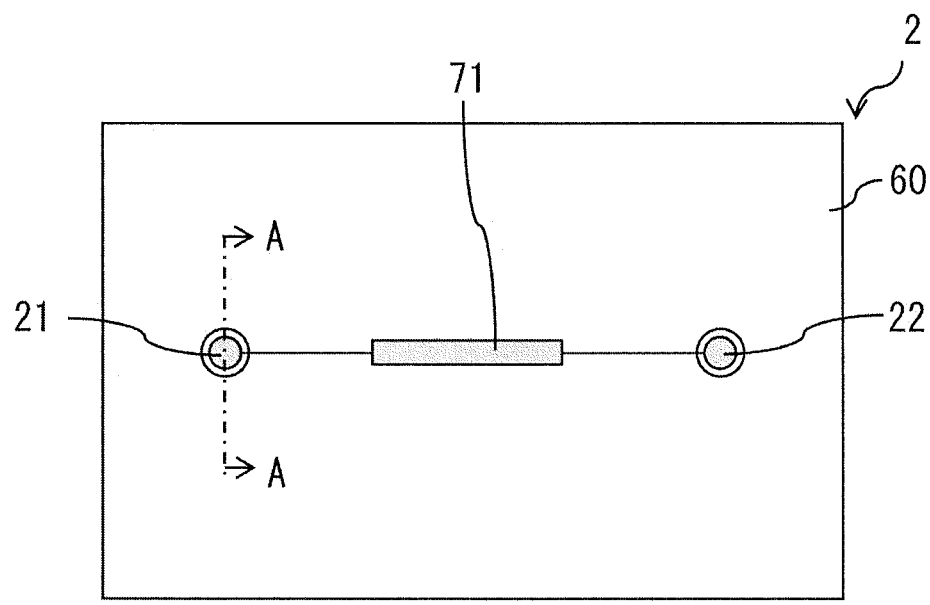

[ FIG. 27 ]
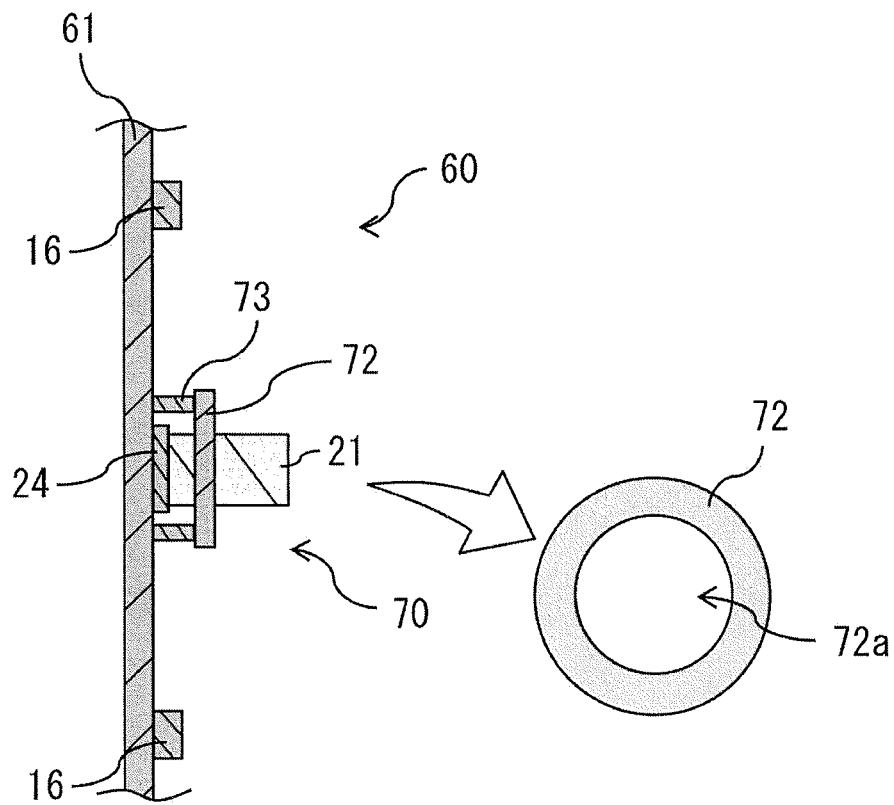
[ FIG. 28 ]
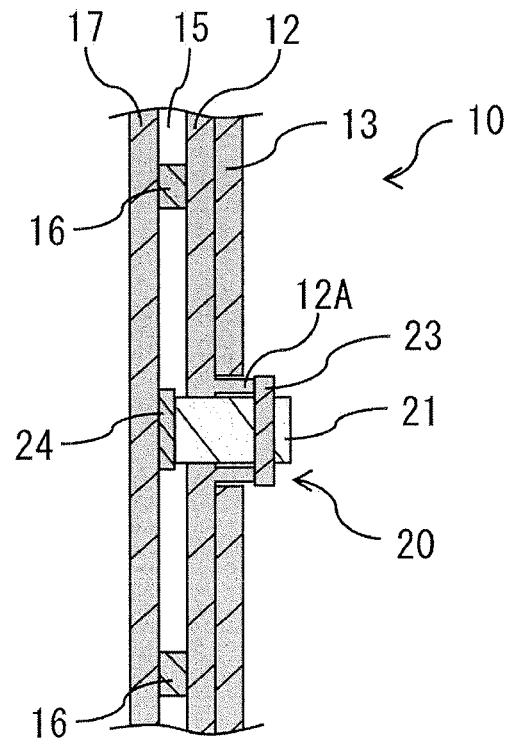

[ FIG. 29 ]
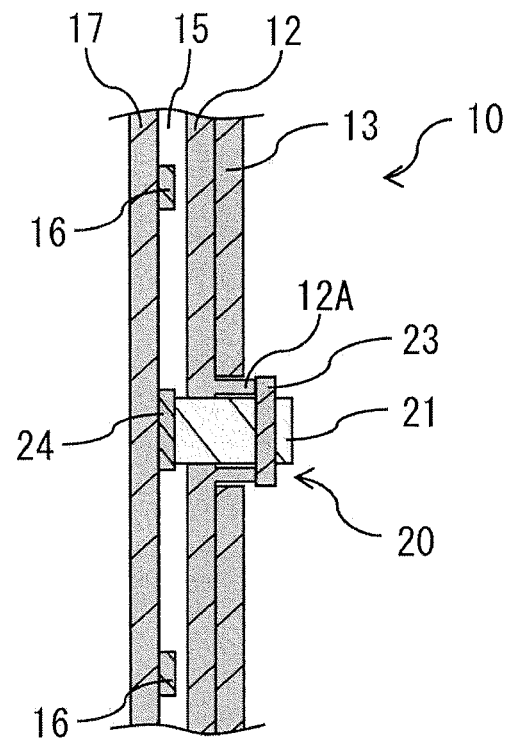
[ FIG. 30 ]
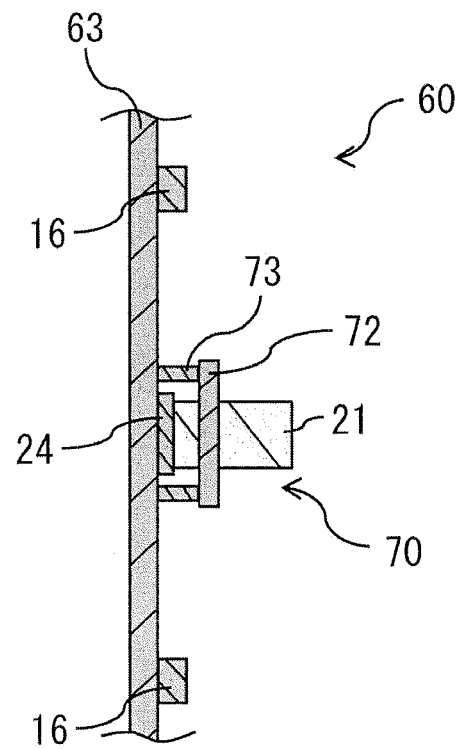

[ FIG. 31 ]
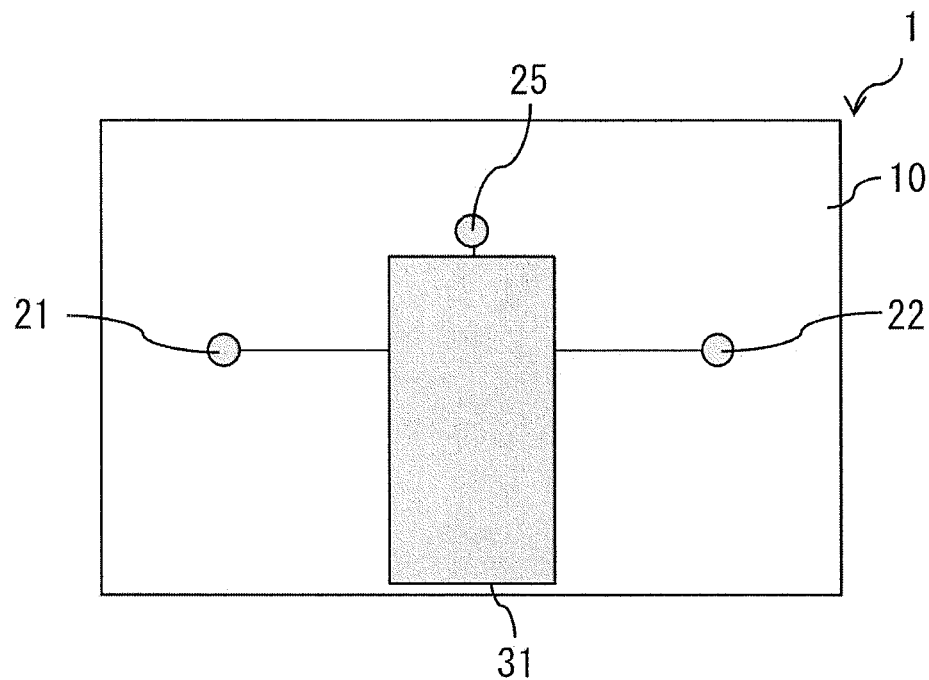
[ FIG. 32 ]
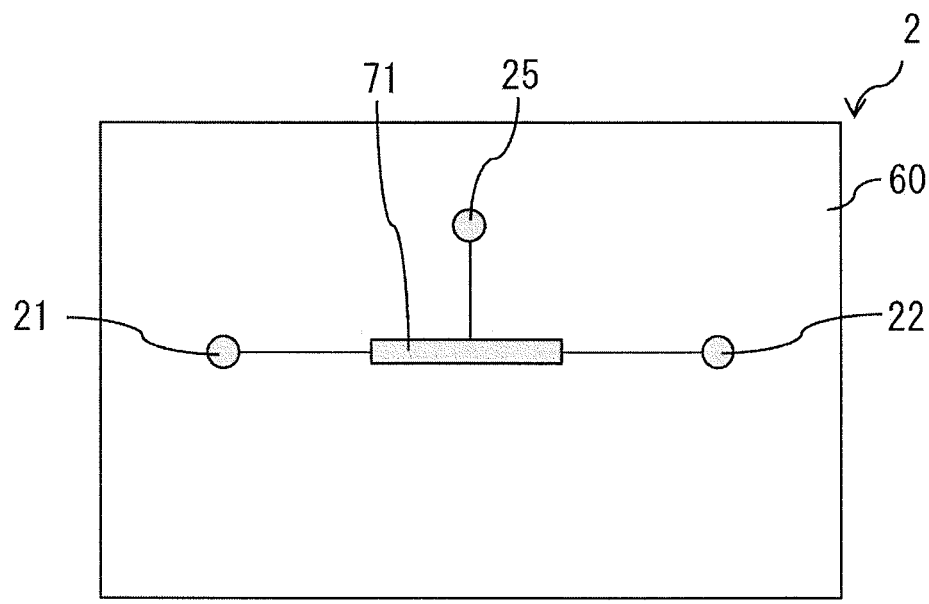

[ FIG. 33 ]
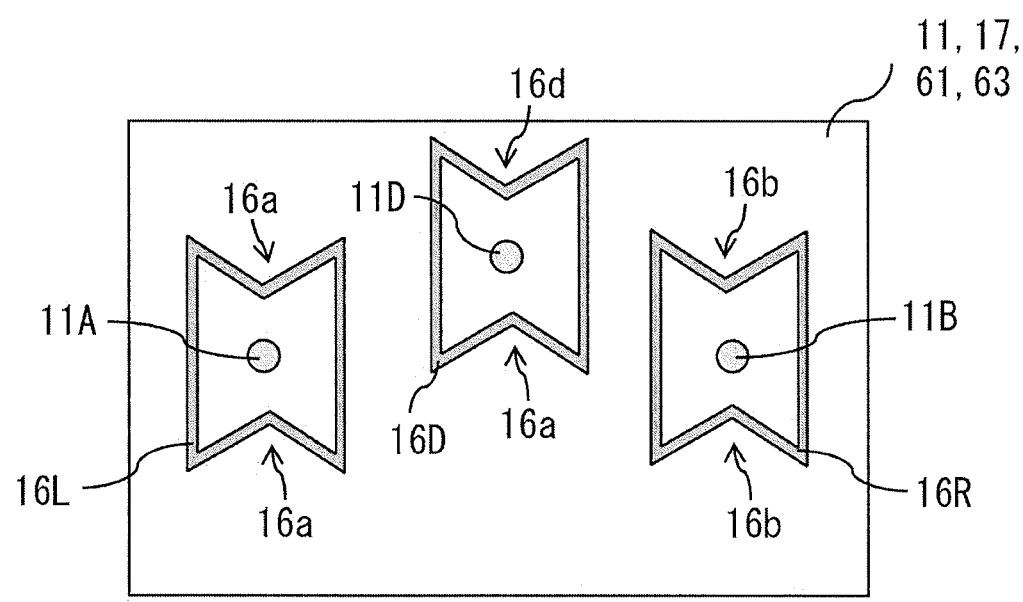
[ FIG. 34 ]
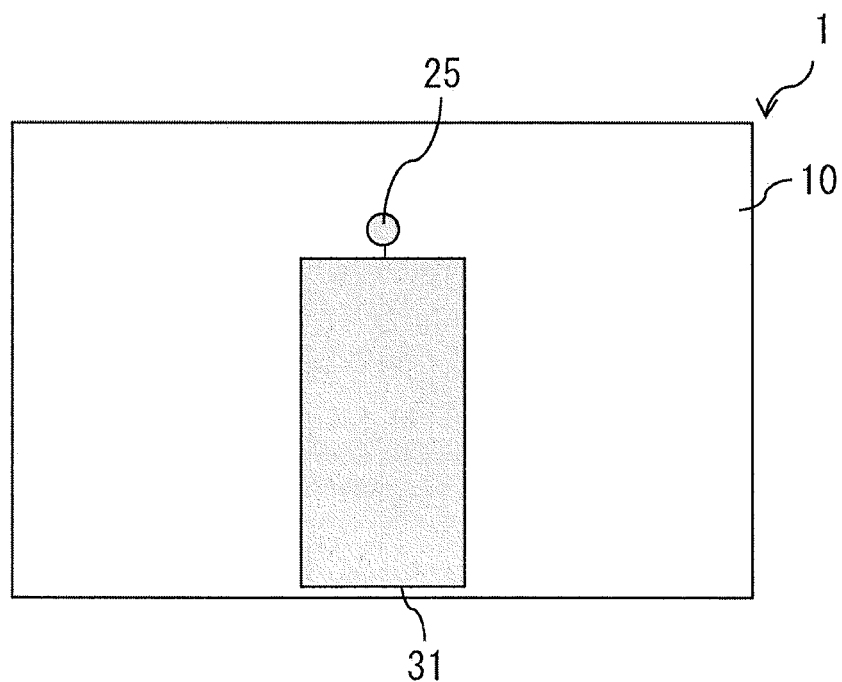

[ FIG. 35 ]
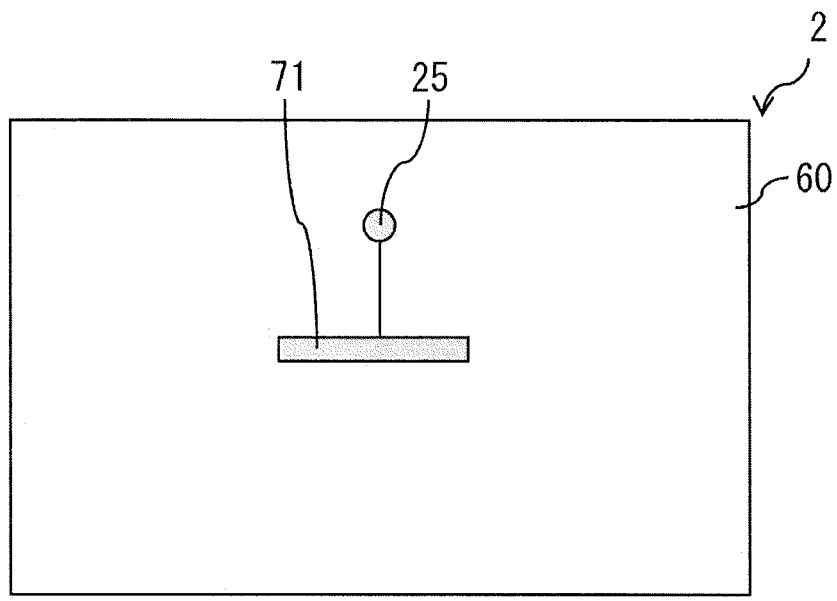
[ FIG. 36 ]
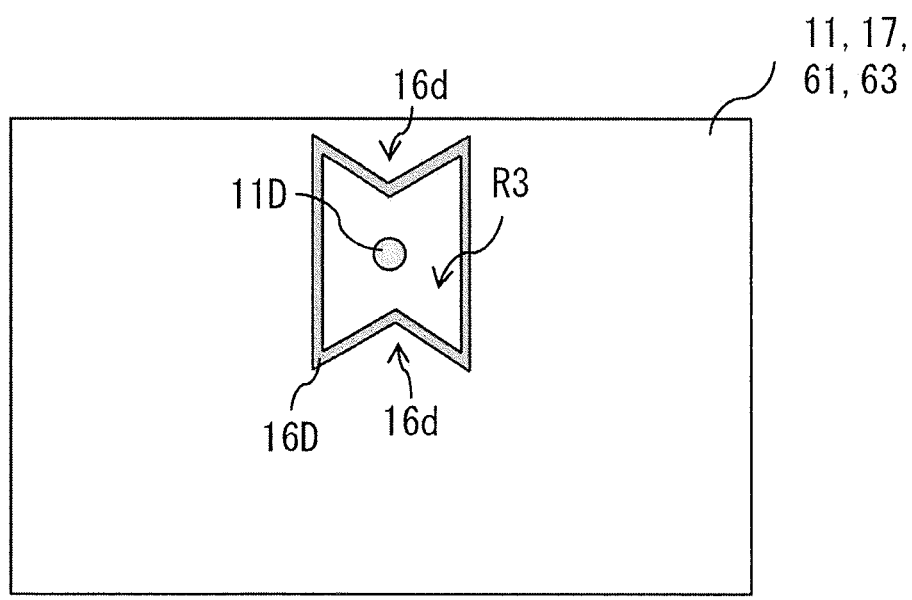

[ FIG. 37 ]
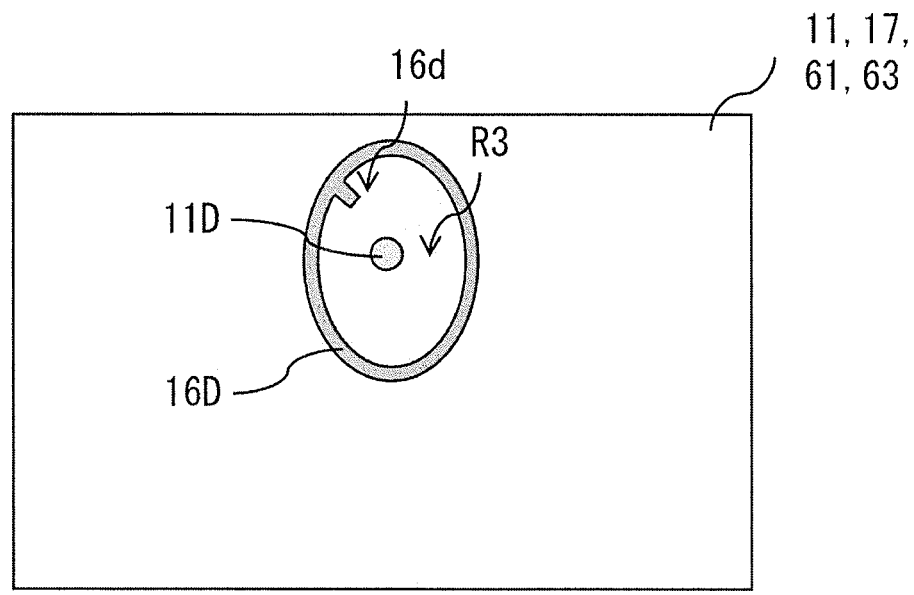
[ FIG. 38 ]
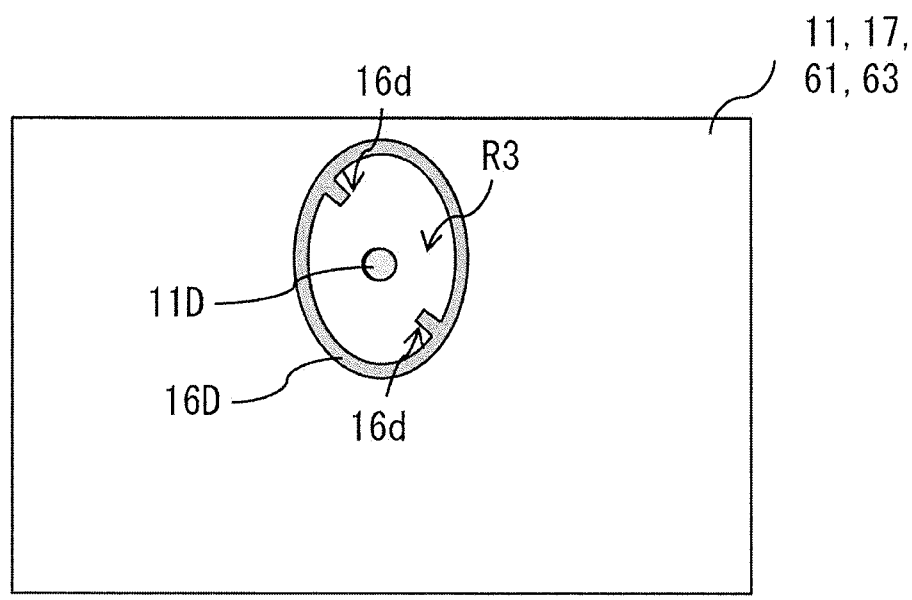

[ FIG. 39 ]
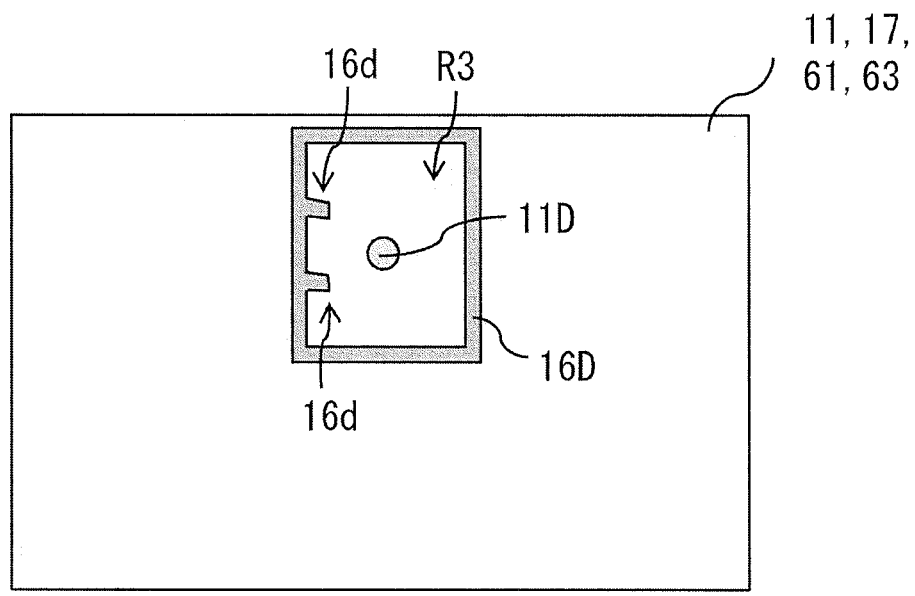
[ FIG. 40 ]
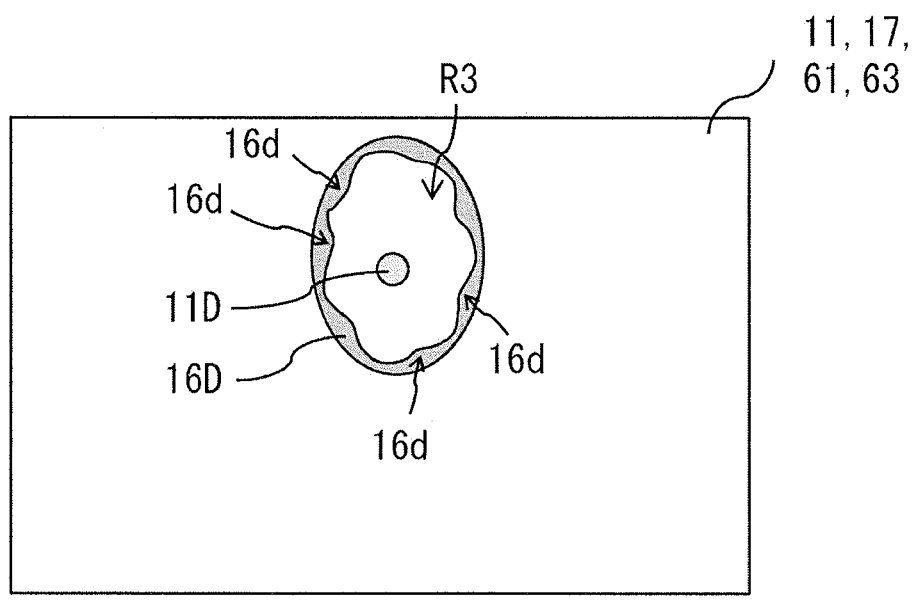

[ FIG. 41 ]
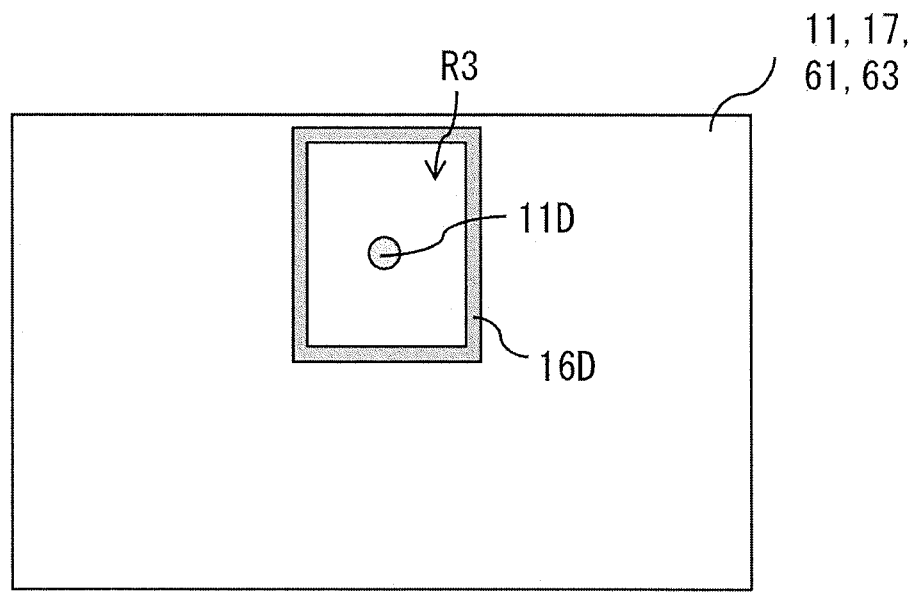
[ FIG. 42 ]
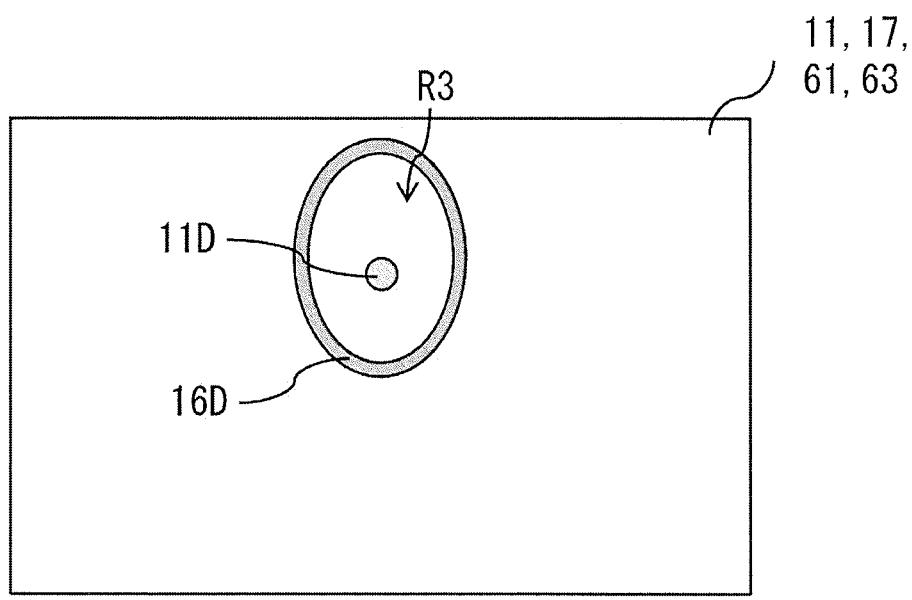

[ FIG. 43 ]
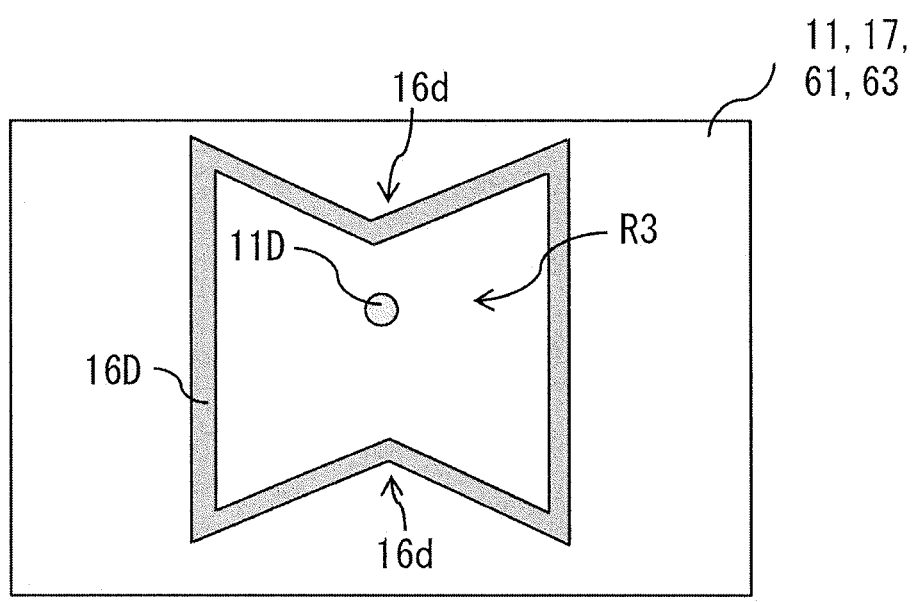

FLAT PANEL SPEAKER AND DISPLAY UNIT

CROSS-REFERENCE TO RELATED APPLICATIONS

This application is a national phase entry under 35 U.S.C. § 371 of International Application No. PCT/JP2017/041065 filed Nov. 15, 2017, which claims the priority from Japanese Patent Application No. 2016-253665 filed Dec. 27, 2016, and Japanese Patent Application No. 2017-099449, filed May 19, 2017, the entire contents of which are hereby incorporated by reference.

TECHNICAL FIELD

The disclosure relates to a flat panel speaker and a display unit.

BACKGROUND ART

Thickness and weight of displays have been rapidly reduced. Accordingly, thickness and weight of speakers have been also reduced, and use of a flat panel speaker (FPS) in place of or together with a cone-type speaker has been proposed. A range of uses of the flat panel speaker is expected to increase, and the flat panel speaker may be applied not only to a display, but also to a poster, etc. displayed at an exhibition, etc. For example, PTL 1 to PTL 3 each disclose a flat panel speaker.

CITATION LIST

Patent Literature

PTL 1: Japanese Unexamined Patent Application Publication No. 2007-143010
PTL 2: Japanese Unexamined Patent Application Publication No. 2009-159104
PTL 3: Japanese Unexamined Patent Application Publication (Published Japanese Translation of PCT Application) No. 2002-510182

SUMMARY OF INVENTION

However, in a typical flat panel speaker, there are cases where sound quality declines, such as a case where glare occurs in sound, and a case where sound of a specific frequency band is not easily emitted, due to an influence of a stationary wave that occurs in a vibration plate. It is therefore desirable to provide a flat panel speaker and a display unit that make it possible to suppress a decline in sound quality.

A first flat panel speaker according to an embodiment of the disclosure includes a flat panel, and a plurality of vibrators that are disposed on a back surface of the flat panel and cause the flat panel to vibrate. The plurality of vibrators are disposed to avoid a location that most easily vibrates in an entire range of audio frequencies when vibration is generated in the flat panel by the plurality of vibrators.

A first display unit according to an embodiment of the disclosure includes a display cell that is shaped like a thin plate and displays an image, and a plurality of vibrators that are disposed on a back surface of the display cell and cause the display cell to vibrate. The plurality of vibrators are disposed to avoid a location that most easily vibrates in an entire range of audio frequencies when vibration is generated in the display cell by the plurality of vibrators.

In the first flat panel speaker and the first display unit according to the respective embodiments of the disclosure, the plurality of vibrators disposed on the back surface of the flat panel or the display cell are disposed to avoid the location that most easily vibrates in the entire range of audio frequencies when vibration is generated in the flat panel or the display cell by the plurality of vibrators. A large stationary wave with respect to the flat panel or the display cell therefore does not easily occur.

A second flat panel speaker according to an embodiment of the disclosure includes a flat panel, and a vibrator that is disposed on a back surface of the flat panel and causes the flat panel to vibrate. The vibrator is disposed to avoid a location that most easily vibrates in an entire range of audio frequencies when vibration is generated in the flat panel by the vibrator.

A second display unit according to an embodiment of the disclosure includes a display cell that is shaped like a thin plate and displays an image, and a vibrator that is disposed on a back surface of the display cell and causes the display cell to vibrate. The vibrator is disposed to avoid a location that most easily vibrates in an entire range of audio frequencies when vibration is generated in the flat panel by the vibrator.

In the second flat panel speaker and the second display unit according to the respective embodiments of the disclosure, the plurality of vibrators disposed on the back surface of the flat panel or the display cell are disposed to avoid the location that most easily vibrates in the entire range of audio frequencies when vibration is generated in the flat panel or the display cell by the plurality of vibrators. A large stationary wave with respect to the flat panel or the display cell therefore does not easily occur.

Effects of Invention

According to the first flat panel speaker and the first display unit of the respective embodiments of the disclosure, a large stationary wave with respect to the flat panel or the display cell does not easily occur, thus making it possible to suppress a decline in sound quality.

According to the second flat panel speaker and the second display unit of the respective embodiments of the disclosure, a large stationary wave with respect to the flat panel or the display cell does not easily occur, thus making it possible to suppress a decline in sound quality.

It is to be noted that effects of the technology are not necessarily limited to the effects described here, and may be any of effects described therein.

BRIEF DESCRIPTION OF DRAWINGS

FIG. 1 illustrates a side-face configuration example of a flat panel speaker according to a first embodiment of the disclosure.
FIG. 2 illustrates a rear-face configuration example of the flat panel speaker in FIG. 1.
FIG. 3 illustrates a configuration example of a rear face of the flat panel speaker when a back chassis in FIG. 2 is removed.
FIG. 4 illustrates a cross-sectional configuration example taken along a line A-A in FIG. 3.
FIG. 5 illustrates a cross-sectional configuration example taken along a line B-B in FIG. 3.
FIG. 6 illustrates a cross-sectional configuration example of a vibration controlling member in FIG. 4.

FIG. 7 illustrates a plane configuration example of the vibration controlling member in FIG. 4.

FIG. 8 illustrates a plane configuration example of the vibration controlling member in FIG. 4.

FIG. 9 illustrates a plane configuration example of the vibration controlling member in FIG. 4.

FIG. 10 illustrates a plane configuration example of the vibration controlling member in FIG. 4.

FIG. 11 illustrates a plane configuration example of the vibration controlling member in FIG. 4.

FIG. 12 illustrates a plane configuration example of the vibration controlling member in FIG. 4.

FIG. 13 illustrates a plane configuration example of the vibration controlling member in FIG. 4.

FIG. 14 illustrates a plane configuration example of the vibration controlling member in FIG. 4.

FIG. 15 illustrates a plane configuration example of the vibration controlling member in FIG. 4.

FIG. 16 illustrates a plane configuration example of the vibration controlling member in FIG. 4.

FIG. 17 illustrates a plane configuration example of the vibration controlling member in FIG. 4.

FIG. 18 illustrates a plane configuration example of the vibration controlling member in FIG. 4.

FIG. 19 illustrates a plane configuration example of the vibration controlling member in FIG. 4.

FIG. 20 illustrates a plane configuration example of the vibration controlling member in FIG. 4.

FIG. 21 illustrates a modification example of the cross-sectional configuration in FIG. 5.

FIG. 22 illustrates a modification example of the side-face configuration of the panel speaker in FIG. 1.

FIG. 23 illustrates a rear-face configuration example of the flat panel speaker in FIG. 22.

FIG. 24 illustrates a side-face configuration example of a flat panel speaker according to a second embodiment of the disclosure.

FIG. 25 illustrates a rear-face configuration example of the flat panel speaker in FIG. 24.

FIG. 26 illustrates a configuration example of a rear face of the flat panel speaker when a back chassis in FIG. 25 is removed.

FIG. 27 illustrates a cross-sectional configuration example taken along a line A-A in FIG. 26.

FIG. 28 illustrates a modification example of the cross-sectional configuration in FIG. 5.

FIG. 29 illustrates a modification example of the cross-sectional configuration in FIG. 21.

FIG. 30 illustrates a modification example of the cross-sectional configuration in FIG. 27.

FIG. 31 illustrates a modification example of the rear-face configuration in FIG. 3.

FIG. 32 illustrates a modification example of a rear-face configuration in FIG. 27.

FIG. 33 illustrates a modification example of a rear-face configuration in FIG. 7.

FIG. 34 illustrates a modification example of the rear-face configuration in FIG. 31.

FIG. 35 illustrates a modification example of the rear-face configuration in FIG. 32.

FIG. 36 illustrates a modification example of the rear-face configuration in FIG. 33.

FIG. 37 illustrates a modification example of the rear-face configuration in FIG. 36.

FIG. 38 illustrates a modification example of the rear-face configuration in FIG. 36.

FIG. 39 illustrates a modification example of the rear-face configuration in FIG. 36.

FIG. 40 illustrates a modification example of the rear-face configuration in FIG. 36.

FIG. 41 illustrates a modification example of the rear-face configuration in FIG. 36.

FIG. 42 illustrates a modification example of the rear-face configuration in FIG. 36.

FIG. 43 illustrates a modification example of the rear-face configuration in FIG. 36.

MODES FOR CARRYING OUT THE INVENTION

Some embodiments of the disclosure are described below in detail with reference to the drawings. The following description is a specific example of the disclosure, and the disclosure is not limited to the following implementation.

1. First Embodiment

[Configuration]

A flat panel speaker 1 according to a first embodiment of the disclosure is described. FIG. 1 illustrates a side-face configuration example of the flat panel speaker 1 according to the present embodiment. FIG. 2 illustrates a rear-face configuration example of the flat panel speaker 1 in FIG. 1. The flat panel speaker 1 also serves as a display unit that displays an image. In other words, it may be said that the display unit includes the flat panel speaker 1 built therein, and is configured to be able to output sound from a display surface that displays an image.

The flat panel speaker 1 includes, for example, a panel section 10 serving as a vibration plate, and a vibration section 20 disposed on a back surface of the panel section 10 and causing the panel section 10 to vibrate. The flat panel speaker 1 further includes, for example, a signal processor 30 that controls the vibration section 20, and a support section 40 that supports the panel section 10 through a rotation section 50. The rotation section 50 adjusts an inclination of the panel section 10 when the support section 40 supports the back surface of the panel section 10. The rotation section 50 is configured by, for example, a hinge that supports the panel section 10 and the support section 40 rotatably.

The vibration section 20 and the signal processor 30 are disposed on the back surface of the panel section 10. The panel section 10 includes a back chassis 19 on back-surface side of the panel section 10, and the back chassis 19 protects the panel section 10, the vibration section 20, and the signal processor 30. The back chassis 19 is configured by, for example, a planar metal plate or resin plate. The back chassis 19 is coupled to the rotation section 50.

FIG. 3 illustrates a configuration example of a rear face of the flat panel speaker 1 when the back chassis 19 is removed. FIG. 4 illustrates a cross-sectional configuration example taken along a line A-A in FIG. 3. FIG. 5 illustrates a cross-sectional configuration example taken along a line B-B in FIG. 3. It is to be noted that FIG. 5 illustrates an example of a cross-sectional configuration near a vibrator 21 (an actuator) described later, but this cross-sectional configuration is assumed to have a cross-sectional configuration similar to a cross-sectional configuration near another vibrator (e.g., a vibrator 22 (an actuator)).

The panel section 10 includes, for example, a display cell 11 shaped like a thin plate to display an image, and an inner plate 12 (a facing plate) disposed to face the display cell 11 with a clearance 15 formed therebetween. In the display cell 11 serving as the vibration plate, for example, an edge of the display cell 11 may be round, and, for example, four corners of the display cell 11 may be round. The panel section 10 further includes, for example, a glass substrate 13 disposed in contact with a back surface of the inner plate 12, and a fixing member 14 disposed between the display cell 11 and the inner plate 12.

The fixing member 14 serves to fix the display cell 11 and the inner plate 12 to each other, and serves as a spacer that maintains the clearance 15. The fixing member 14 is disposed, for example, along an outer edge of the display cell 11. The fixing member 14 may have, for example, flexibility to the extent that an end edge of the display cell 11 is allowed to serve as a free end when the display cell 11 vibrates. The fixing member 14 is configured by, for example, a buffer layer such as a sponge having a bonding layer on each of both sides.

The inner plate 12 is a substrate that supports the vibrators 21 and 22 described later. The inner plate 12 has, for example, an opening at a location where each of the vibrators 21 and 22 is to be installed, and a protrusion 12A provided around the opening to support a fixing section 23 described later. The protrusion 12A protrudes on side opposite to the display cell 11. The glass substrate 13 has rigidity higher than that of the inner plate 12, and has a role in suppressing deflection or vibration of the inner plate 12. The glass substrate 13 has an opening at a position facing the protrusion 12A. The opening provided in the glass substrate 13 has a size that allows the protrusion 12A and the vibrator 21 or the vibrator 22 to be inserted therein. In place of the glass substrate 13, a resin substrate having rigidity equal to that of the glass substrate 13 may be provided.

The vibration section 20 includes, for example, two vibrators (the vibrators 21 and 22). The vibrator 21 and the vibrator 22 have a common configuration. The vibrators 21 and 22 are disposed to avoid a location that most easily vibrates in the entire range of audio frequencies (e.g., 20 Hz to 20 kHz) when vibration is generated in the display cell 11 by the vibrators 21 and 22. Examples of the "location that most easily vibrates" include the location of anti-node of a largest stationary wave that occurs in the display cell 11, when vibration is generated in the display cell 11 by the vibrators 21 and 22. Further, the vibrators 21 and 22 are disposed to avoid a location that least easily vibrates in the entire range of audio frequencies when vibration is generated in the display cell 11 by the vibrators 21 and 22. The vibration of the display cell 11 is determined by, for example, measuring vibration of the entire surface of the display cell 11 in the entire range of audio frequencies, using a laser Doppler vibrometer. The vibrators 21 and 22 are disposed, for example, at locations having an indivisible ratio, in a lateral direction and a vertical direction of the display cell 11. Examples of the "indivisible ratio" include 3:4, 5:7, 3:7, 2:5, and 7:11.

The vibrator 21 is disposed on the left when the display cell 11 is viewed from a back surface. The vibrator 22 is disposed on the right when the display cell 11 is viewed from the back surface. The vibrators 21 and 22 each include, for example, a voice coil, a bobbin on which the voice coil is wound, and a magnetic circuit, and the vibrators 21 and 22 each serve as a speaker actuator to be a vibration source. When a sound current of an electric signal flows to the voice coil, the vibrators 21 and 22 each generate a driving force in the voice coil in accordance with the principle of electromagnetic action. This driving force is transmitted to the display cell 11 through a vibration transmission member 24 described later, and thereby generates vibration depending on a change in the sound current in the display cell 11. This causes air to vibrate, thereby changing a sound pressure.

The vibration section 20 further includes, for example, the fixing section 23 and the vibration transmission member 24 for each of the vibrators (the vibrators 21 and 22).

The fixing section 23 has, for example, an opening 23a provided to fix the vibrator 21 or the vibrator 22 in a state of being inserted therein. The fixing section 23 further has, for example, a plurality of screw holes 23b through each of which a screw is to be inserted, and the screw is used in fixing the fixing section 23 to the protrusion 12A. For example, the vibrators (the vibrators 21 and 22) are each fixed to the inner plate 12 through the fixing section 23. The fixing section 23 may have, for example, a function as a heatsink that radiates heat generated from the vibrator 21 or the vibrator 22, besides fixing the vibrator 21 or the vibrator 22 to the inner plate 12.

The vibration transmission member 24 is, for example, in contact with the back surface of the display cell 11 and with the bobbin of the vibrator 21 or the vibrator 22 of the display cell 11, and is fixed to the back surface of the display cell 11 and to the bobbin of the vibrator 21 or the vibrator 22. The vibration transmission member 24 is configured by a member at least having a characteristic of being resilient in a sound wave region (20 Hz or more). The vibration transmission member 24 is configured by, for example, thermosetting resin, double-sided tape, or low-resilience urethane, etc. In a case where the vibration transmission member 24 is configured by the thermosetting resin, the vibration transmission member 24 is formed, for example, by generating heat in the voice coil through passage of an electric current to the voice coil, and curing the thermosetting resin with the heat. In a case where the vibration transmission member 24 is configured by the double-sided tape, the vibration transmission member 24 is fixed to the back surface of the display cell 11 and to the bobbin of the vibrator 21 or the vibrator 22, for example, by inputting a constant pulse signal to the voice coil and pressing the double-sided tape hard with the voice coil. In a case where the vibration transmission member 24 is configured by the low-resilience urethane, it is preferable that the low-resilience urethane has a characteristic of being resilient in the sound wave region (20 Hz or more) and has a characteristic of following in a low frequency region (less than 20 Hz). Hence, it is possible for the low-resilience urethane to follow displacement of the display cell 11 caused by shock from outside, without attenuating vibration of sound.

Incidentally, the panel section 10 includes, for example, a vibration controlling member 16 as illustrated in FIG. 5. The vibration controlling member 16 has a function of preventing a stationary wave caused by interference between vibration generated in the display cell 11 by the vibrator 21 and vibration generated in the display cell 11 by the vibrator 22. The vibration controlling member 16 may be configured by, for example, a material allowed to control reflection in the sound wave region (20 Hz or more) with respect to vibration generated by the vibrator 22. Further, the vibration controlling member 16 may be configured by, for example, a material allowed to absorb vibration or reverberation generated by the vibrator 22. The vibration controlling member 16 is disposed in a clearance between the display cell 11 and the inner plate 12, i.e., in a clearance 16. The vibration controlling member 16 is fixed at least to the back surface of the display cell 11, among the back surface of the display cell 11 and a surface of the inner plate 12. The vibration controlling member 16 is, for example, in contact with the surface of the inner plate 12.

FIG. 6 illustrates a cross-sectional configuration example of the vibration controlling member 16. The vibration controlling member 16 is, for example, a stacked body in which a bonding layer 161 (or an adhesive layer 166), a sponge layer 162, a base material layer 163, a sponge layer 164, and a bonding layer 165 (or an adhesive layer 167) are stacked in this order from side of the display cell 11. The bonding layer 161 is in contact with the back surface of the display cell 11, and fixes the vibration controlling member 16 to the back surface of the display cell 11. The sponge layers 162 and 164 are layers that bring the above-described function. The sponge layers 162 and 164 are each configured by, for example, a flexible member that is poor in self-supporting. At this time, the vibration controlling member 16 includes a sponge as the flexible member that is poor in self-supporting, and further includes the adhesive layer 166 or the bonding layer 161 that fixes the sponge to the back surface of the display cell 11.

In a case where the sponge layers 162 and 164 each have high hardness, reflection of a sound wave at the sponge layers 162 and 164 is strong. Hence, in-plane distribution of a stationary wave is not flat, but a sound pressure tends to rise. In a case where the sponge layers 162 and 164 each have low hardness, the reflection of the sound wave at the sponge layers 162 and 164 weakens. Hence, the in-plane distribution of the stationary wave comes closer to being flat, but the sound pressure tends to fall.

It is to be noted that insofar as the vibration controlling member 16 has the above-described function, the vibration controlling member 16 is not limited to the configuration illustrated in FIG. 6. The vibration controlling member 16 may include, for example, an adhesive or a bond as the flexible member that is poor in self-supporting. The vibration controlling member 16 may have a configuration similar to that of the vibration transmission member 24 or the fixing section 23, for example. The vibration controlling member 16 may be, for example, a magnet sheet fixed to the display cell 11, or a hook-and-loop fastener fixed to the display cell 11 and the inner plate 12.

FIG. 7 to FIG. 16 each illustrate a plane configuration example of the vibration controlling member 16. Here, assume that on the back surface of the display cell 11, a position facing the vibrator 21 (a first vibrator) is a vibration point 11A (a first vibration point), and a position facing the vibrator 22 (a second vibrator) is a vibration point 11B (a second vibration point). In this situation, the vibration controlling member 16 partitions the back surface of the display cell 11 into a partition region R1 (a first partition region) including the vibration point 11A and a partition region R2 (a second partition region) including the vibration point 11B. The vibration controlling member 16 may include, for example, a vibration controlling member 16L (a first vibration controlling member) that forms the partition region R1, and a vibration controlling member 16R (a second vibration controlling member) that forms the partition region R2.

The vibration controlling member 16L may include, for example, a plurality of protrusions 16a (first protrusions) protruding toward the vibration point 11A, as illustrated in FIG. 7 and FIG. 9 to FIG. 12. The vibration controlling member 16R may include, for example, a plurality of protrusions 16b (second protrusions) protruding toward the vibration point 11B, as illustrated in FIG. 7 and FIG. 9 to FIG. 12. The vibration controlling member 16L may include, for example, one protrusion 16a protruding toward the vibration point 11A, as illustrated in FIG. 8. The vibration controlling member 16R may include, for example, one protrusion 16b protruding toward the vibration point 11B, as illustrated in FIG. 8. From the viewpoint of suppression of a stationary wave, it is preferable that the vibration controlling member 16L include many protrusions 16a, and it is preferable that the vibration controlling member 16R include many protrusions 16a.

The vibration controlling member 16L may be, for example, formed to have the partition region R1 being a closed region on the back surface of the display cell 11, as illustrated in FIG. 7 to FIG. 11. The vibration controlling member 16R may be, for example, formed to have the partition region R2 being a closed region on the back surface of the display cell 11, as illustrated in FIG. 7 to FIG. 11. The vibration controlling member 16L and the vibration controlling member 16R may be, for example, formed to have the partition region R1 and the partition region R2 communicating with each other and being a closed region on the back surface of the display cell 11, as illustrated in FIG. 12.

The vibration controlling member 16L may be, for example, shaped like a circular ring or a polygonal ring without having a location protruding toward the vibration point 11A, as illustrated in FIG. 13 and FIG. 14. The vibration controlling member 16R may be, for example, shaped like a circular ring or a polygonal ring without having a location protruding toward the vibration point 11B, as illustrated in FIG. 13 and FIG. 14. The vibration controlling member 16L may have, for example, a shape in which a ring-shaped protrusion is divided into two or more parts, as illustrated in FIG. 15 and FIG. 16. The vibration controlling member 16R may have, for example, a shape in which a ring-shaped protrusion is divided into two or more parts, as illustrated in FIG. 15 and FIG. 16. The vibration controlling member 16L may have, for example, an aspect ratio different from 1:1, as illustrated in FIG. 7 to FIG. 14. The vibration controlling member 16R may have, for example, an aspect ratio different from 1:1, as illustrated in FIG. 7 to FIG. 14. The vibration controlling member 16L is, for example, disposed near the left edge of the display cell 11 as illustrated in FIG. 10, FIG. 17, and FIG. 18, and the vibration controlling member 16R is, for example, disposed near the right edge of the display cell 11, as illustrated in FIG. 10, FIG. 17, and FIG. 18. In this situation, the plurality of protrusions 16a may be disposed near the left edge of the display cell 11 in the vibration controlling member 16L, and the plurality of protrusions 16b may be disposed near the right edge of the display cell 11 in the vibration controlling member 16R. The vibration controlling member 16L may be, for example, laterally symmetrical, when viewed from a central part of the display cell 11, as illustrated in FIG. 7 to FIG. 18. The vibration controlling member 16R may be, for example, laterally symmetrical, when viewed from the central part of the display cell 11, as illustrated in FIG. 7 to FIG. 18. The vibration controlling member 16L may be, for example, vertically symmetrical when viewed from the central part of the display cell 11, as illustrated in FIG. 7, FIG. 10, and FIG. 13 to FIG. 18. The vibration controlling member 16R may be, for example, vertically symmetrical when viewed from the central part of the display cell 11, as illustrated in FIG. 7, FIG. 10, and FIG. 13 to FIG. 18.

The vibration controlling member 16 may be, for example, formed between the vibration point 11A and the vibration point 11B, as illustrated in FIG. 19 and FIG. 20. The vibration controlling member 16 may be, for example, formed to have an X shape having a center disposed on a straight line connecting the vibration point 11A and the vibration point 11B, as illustrated in FIG. 19. The vibration controlling member 16 may be, for example, formed to have an I shape having an extending direction intersecting (for example, orthogonal to) a straight line connecting the vibration point 11A and the vibration point 11B, as illustrated in FIG. 20.

The vibration controlling member 16L and the vibration controlling member 16R may have, for example, a laterally symmetrical shape, as illustrated in FIG. 7 to FIG. 14. It is to be noted that the vibration controlling member 16 may be, for example, disposed away from the surface of the inner plate 12, as illustrated in FIG. 21, insofar as the vibration controlling member 16 has the above-described function.

[Effects]

Next, effects of the flat panel speaker 1 according to the present embodiment are described.

Thickness and weight of displays have been rapidly reduced. Accordingly, thickness and weight of speakers have been also reduced, and use of a flat panel speaker (FPS) in place of or together with a cone-type speaker has been proposed. A range of uses of the flat panel speaker is expected to increase, and the flat panel speaker may be applied not only to a display, but also to a poster, etc. displayed at an exhibition, etc.

However, in a typical flat panel speaker, there are cases where sound quality declines, such as a case where glare occurs in sound, and a case where sound of a specific frequency band is not easily emitted, due to an influence of a stationary wave that occurs in a vibration plate.

Meanwhile, in the flat panel speaker 1 according to the present embodiment or in the display unit having the flat panel speaker 1 built therein, the plurality of vibrators 21 and 22 are disposed on the back surface of the display cell 11, while avoiding a location that most easily vibrates in the entire range of audio frequencies when vibration is generated in the display cell 11 by the plurality of vibrators 21 and 22. A large stationary wave with respect to the display cell 11 therefore does not easily occur. As a result, it is possible to suppress a decline in sound quality.

Further, in the present embodiment, the plurality of vibrators 21 and 22 are disposed to avoid a location that least easily vibrates in the entire range of audio frequencies when vibration is generated in the display cell 11 by the plurality of vibrators 21 and 22. This makes it possible to generate vibration for the display cell 11.

Furthermore, in the present embodiment, in a case where the plurality of vibrators 21 and 22 are disposed at locations having an indivisible ratio, in the lateral direction and the vertical direction of the display cell 11, a large stationary wave with respect to the display cell 11 does not easily occur. As a result, it is possible to suppress a decline in sound quality.

In addition, in the flat panel speaker 1 according to the present embodiment or in the display unit having the flat panel speaker 1 built therein, the back surface of the display cell 11 is partitioned by the vibration controlling member 16 fixed to the back surface of the display cell 11 into the partition region R1 including the vibration point 11A and the partition region R2 including the vibration point 11B. This prevents a stationary wave caused by interference between vibration generated in the display cell 11 by the vibrator 21 and vibration generated in the display cell 11 by the vibrator 22. As a result, it is possible to suppress a decline in sound quality.

Moreover, in the present embodiment, in a case where the vibration controlling member 16L is provided with the one or more protrusions 16a protruding toward the vibration point 11A, and the vibration controlling member 16R is provided with the one or more protrusions 16b protruding toward the vibration point 11B, occurrence of a stationary wave is prevented by the one or more protrusions 16a and the one or more protrusions 16b. As a result, it is possible to suppress a decline in sound quality.

Further, in the present embodiment, in a case where the vibration controlling member 16L is formed to have the partition region R1 being a closed region on the back surface of the display cell 11, a stationary wave caused by vibration generated in the display cell 11 by the vibrator 21 is prevented. Furthermore, in the present embodiment, in a case where the vibration controlling member 16R is formed to have the partition region R2 being a closed region on the back surface of the display cell 11, a stationary wave caused by vibration generated in the display cell 11 by the vibrator 22 is prevented. Accordingly, in this case as well, it is possible to suppress a decline in sound quality. It is to be noted that even in a case where the vibration controlling member 16L and the vibration controlling member 16R are formed to have the partition region R1 and the partition region R2 communicating with each other and being a closed region on the back surface of the display cell 11, a stationary wave caused by vibration generated in the display cell 11 by the vibrator 21 is prevented and a stationary wave caused by vibration generated in the display cell 11 by the vibrator 22 is prevented. Accordingly, in this case as well, it is possible to suppress a decline in sound quality.

In addition, in the present embodiment, also in a case where the vibration controlling member 16L is shaped like a circular ring or a polygonal ring without having a location protruding toward the vibration point 11A, a stationary wave caused by vibration generated in the display cell 11 by the vibrator 21 is prevented. Moreover, also in a case where the vibration controlling member 16R is shaped like a circular ring or a polygonal ring without having a location protruding toward the vibration point 11B, a stationary wave caused by vibration generated in the display cell 11 by the vibrator 22 is prevented. Accordingly, in this case as well, it is possible to suppress a decline in sound quality.

In addition, in the present embodiment, also in a case where the vibration controlling member 16 is formed between the vibration point 11A and the vibration point 11B, a stationary wave caused by interference between vibration generated in the display cell 11 by the vibrator 21 and vibration generated in the display cell 11 by the vibrator 22 is prevented by devising a layout of the vibration controlling member 16. As a result, it is possible to suppress a decline in sound quality.

Moreover, in the present embodiment, in a case where the vibration controlling member 16L is disposed near the left edge of the display cell 11, and the vibration controlling member 16R is disposed near the right edge of the display cell 11, and further where the plurality of protrusions 16a are disposed near the left edge of a flat panel 11 in the vibration controlling member 16L, and the plurality of protrusions 16b are disposed near the right edge of the flat panel 11 in the vibration controlling member 16R, it is possible to adjust directivity of a sound wave by adjusting a size, etc. of the protrusions 16a and 16b.

In addition, in the present embodiment, in a case where the aspect ratio of the vibration controlling member 16L is different from 1:1, and further the aspect ratio of the vibration controlling member 16R is different from 1:1, a large stationary wave with respect to the display cell 11 does not easily occur. As a result, it is possible to suppress a decline in sound quality.

Moreover, in the present embodiment, in a case where the vibration controlling members 16L and 16R each have a shape in which the ring-shaped protrusion is divided into two or more parts, it is possible to allow a stationary wave to escape from a clearance formed in each of the vibration controlling members 16L and 16R. A large stationary wave with respect to the display cell 11 therefore does not easily occur. As a result, it is possible to suppress a decline in sound quality.

Further, in the present embodiment, in a case where each of the vibration controlling members 16L and 16R is laterally symmetrical and vertically symmetrical, when viewed from the middle part of the flat panel 11, it is possible to equate a characteristic of sound generated by the vibrator 21 and a characteristic of sound generated by the vibrator 22 with each other. As a result, it is possible to enhance the sound quality.

Furthermore, in the present embodiment, in a case where the edge of the display cell 11 is round or in a case where the four corners of the display cell 11 are round, a large stationary wave with respect to the display cell 11 does not easily occur. As a result, it is possible to suppress a decline in sound quality.

In addition, in the present embodiment, in a case where the vibration controlling member 16 is configured by a flexible member that is poor in self-supporting, reflection of a sound wave in the vibration controlling member 16 weakens. This brings in-plane distribution of the stationary wave closer to being flat, thereby making it possible to suppress a decline in sound quality. Moreover, in the present embodiment, also in a case where the vibration controlling member 16 includes a sponge as the flexible member that is poor in self-supporting and further includes an adhesive layer 16f or a bonding layer 16a that fixes the sponge to the back surface of the display cell 11, the reflection of the sound wave in the vibration controlling member 16 weakens. This brings the in-plane distribution of the stationary wave closer to being flat, thereby making it possible to suppress a decline in sound quality. Further, in the present embodiment, also in a case where the vibration controlling member 16 includes an adhesive or a bond as the flexible member that is poor in self-supporting, the reflection of the sound wave in the vibration controlling member 16 weakens. This brings the in-plane distribution of the stationary wave closer to being flat, thereby making it possible to suppress a decline in sound quality.

In addition, in the present embodiment, in a case where the vibrators (the vibrators 21 and 22) are each fixed to the inner plate 12 disposed to face the display cell 11 with a predetermined clearance formed therebetween, it is possible to transmit vibration of each of the vibrators (the vibrators 21 and 22) to the display cell 11 efficiently. Hence, it is possible to suppress a decline in sound quality.

Moreover, in the present embodiment, in a case where the vibration controlling member 16 is in contact with the inner plate 12, it is possible to further increase the function of vibration control by the vibration controlling member 16. Hence, it is possible to suppress a decline in sound quality. It is to be noted that, in the present embodiment, in a case where the vibration controlling member 16 is disposed away from the inner plate 12, it is possible to expect a vibration-control effect by a self-weight.

2. Modification Example of First Embodiment

In the foregoing embodiment, for example, the support section 40 and the rotation section 50 may be omitted as illustrated in FIG. 22 and FIG. 23. In this case however, preferably, the back chassis 19 is provided with a recess 32 to be used for hanging the flat panel speaker 1 on a hook provided on a wall, etc. It is to be noted that in a case where a flat panel speaker 2 is placed on a table top stand, the above-described recess 32 may be absent.

3. Second Embodiment

[Configuration]

Next, a flat panel speaker 2 according to a second embodiment of the disclosure is described. FIG. 24 illustrates a side-face configuration example of the flat panel speaker 2 according to the present embodiment. FIG. 25 illustrates a rear-face configuration example of the flat panel speaker 2 in FIG. 24. The flat panel speaker 2 also serves as a display unit that displays an image. In other words, it may be said that the display unit includes the flat panel speaker 2 built therein, and is configured to be able to output sound from a display surface that displays an image.

The flat panel speaker 2 includes, for example, a panel section 60 serving as a vibration plate, and a vibration section 70 disposed on a back surface of the panel section 60 and causing the panel section 60 to vibrate. The flat panel speaker 2 further includes, for example, a support section 80 in which a signal processing circuit 81 that controls the vibration section 70 is built. The support section 80 is fixed to a back chassis 69 through a rotation section 90. The rotation section 90 adjusts an inclination of the panel section 60 when the support section 80 supports the back surface of the panel section 60. The rotation section 90 is configured by, for example, a hinge that supports the panel section 60 and the support section 80 rotatably.

FIG. 26 illustrates a configuration example of a rear face of the flat panel speaker 2 when the back chassis 69 is removed. FIG. 27 illustrates a cross-sectional configuration example taken along a line A-A in FIG. 26.

The panel section 60 includes, for example, a display cell 61 shaped like a thin plate to display an image, and the vibration controlling member 16 fixed to a back surface of the display cell 61. The vibration controlling member 16 has a function of preventing a stationary wave caused by interference between vibration generated in the display cell 61 by the vibrator 21 and vibration generated in the display cell 61 by the vibrator 22. The vibration controlling member 16 has a configuration similar to that in the foregoing embodiment.

The vibration section 70 includes, for example, two vibrators (the vibrators 21 and 22), as with the foregoing embodiment. The vibrator 21 is disposed on the left, when the display cell 61 is viewed from the back surface. The vibrator 22 is disposed on the right, when the display cell 61 is viewed from the back surface. The vibration section 70 further includes a wiring board 71 that electrically couples the signal processing circuit 81 and the two vibrators (the vibrators 21 and 22) together. For example, a flexible wiring board is coupled to the wiring board 71, and the two vibrators (the vibrators 21 and 22) and the signal processing circuit 81 are electrically coupled through this flexible wiring board.

The vibration section 70 further includes, for example, a fixing section 72, a fixing member 73, and the vibration transmission member 24, for each of the vibrators. The fixing section 72 has, for example, an opening 72a provided to fix the vibrator 21 or the vibrator 22 in a state of being inserted therein. For example, the vibrators (the vibrators 21 and 22) are each fixed to the back surface of the display cell 61 through the fixing section 72 and the fixing member 73.

The vibrators (the vibrators 21 and 22) are each fixed at a position different from a position facing the vibrators (the vibrators 21 and 22) by the fixing member 73, with respect to the back surface of the display cell 61. A fixing section 73 may serve, for example, as a heatsink that radiates heat generated from the vibrator 21 or the vibrator 22, besides fixing the vibrator 21 or the vibrator 22 to the back surface of the display cell 61. The fixing member 73 serves to fix the display cell 61 and the fixing section 72 to each other. The fixing member 73 may have, for example, flexibility to the extent of avoiding attenuation of vibration of the display cell 61 when the display cell 61 vibrates. The fixing member 73 is configured by, for example, a sponge having a bonding layer on each of both sides.

[Effects]

In the flat panel speaker 2 according to the present embodiment or in the display unit having the flat panel speaker 2 built therein, the back surface of the display cell 61 is partitioned by the vibration controlling member 16 fixed to the back surface of the display cell 61 into the partition region R1 including the vibration point 11A and the partition region R2 including the vibration point 11B. This prevents a stationary wave caused by interference between vibration generated in the display cell 61 by the vibrator 21 and vibration generated in the display cell 61 by the vibrator 22. As a result, it is possible to suppress a decline in sound quality. It is to be noted that the vibration controlling member 16 in the present embodiment has effects similar to the effects obtained by the vibration controlling member 16 in the foregoing embodiment.

In addition, in the present embodiment, the vibrators (the vibrators 21 and 22) are each fixed at the position different from the position facing the vibrators (the vibrators 21 and 22), with respect to the back surface of the display cell 61. The vibrators (the vibrators 21 and 22) each therefore vibrate together with the display cell 61, and thus, amplitude attributable to resonance increases, which makes it possible to increase an output in a low frequency region.

4. Modification Examples Common to Each Embodiment

Modification Example A

For example, in each of the foregoing embodiments and modification examples thereof, a flat panel 17 or a flat panel 63 having no display function may be provided in place of the display cell 11 or the display cell 61, as illustrated in FIG. 28, FIG. 29, and FIG. 30. In such a case as well, it is possible to obtain effects similar to the effects in each of the foregoing embodiments and modification examples thereof.

Modification Example B

In each of the foregoing embodiments and modification examples thereof, the number of vibrators (actuators) may be three or more. For example, in the above-described first embodiment and the modification example thereof, a vibrator 20 may include three vibrators (the vibrators 21 and 22, as well as a vibrator 25), for example, as illustrated in FIG. 31. Further, for example, a vibrator 70 may include three vibrators (the vibrators 21, 22, and 25) in the above-described second embodiment and the modification example thereof, for example, as illustrated in FIG. 32. In these cases, the third vibrator (the vibrator 25) is positioned, for example, between the vibrator 21 and the vibrator 22, as illustrated in FIG. 31 and FIG. 32. The vibrator 25 (the actuator) has a configuration similar to that of the vibrator 21.

FIG. 33 illustrates a rear-face configuration example of the vibration controlling member 16 in the present modification example. In the present modification example, of the back surface of the display cell 11, the display cell 61, the flat panel 17, or the flat panel 63, a position facing the vibrator 25 is set as a vibration point 11D. In this case, the vibration controlling member 16D partitions the back surface of the display cell 11, the display cell 61, the flat panel 17, or the flat panel 63 into a partition region R3 including the vibration point 11D, and is fixed to the back surface of the display cell 11, the display cell 61, the flat panel 17, or the flat panel 63. The vibration controlling member 16D has a configuration similar to that of the vibration controlling member 16L or the vibration controlling member 16R. Hence, in the present modification example as well, it is possible to obtain effects similar to the effects in each of the foregoing embodiments and modification examples thereof.

Modification Example C

In each of the foregoing embodiments and modification examples thereof, the number of vibrators (actuators) may be one. For example, the vibrator 20 or the vibrator 70 may include one vibrator (the vibrator 25), for example, as illustrated in FIG. 34 and FIG. 35. In this case, the vibrator 25 is disposed to avoid a location that most easily vibrates in the entire range of audio frequencies when vibration is generated in the display cell 11, the display cell 61, the flat panel 17, or the flat panel 63 by the vibrator 25. Further, the vibrator 25 is disposed to avoid a location that least easily vibrates in the entire range of audio frequencies when vibration is generated in the display cell 11, the display cell 61, the flat panel 17, or the flat panel 63 by the vibrator 25. For example, the vibration of the display cell 11, the display cell 61, the flat panel 17, or the flat panel 63 is determined by, for example, measuring vibration of the entire surface of the display cell 11, the display cell 61, the flat panel 17, or the flat panel 63 in the entire range of audio frequencies, by using a laser Doppler vibrometer. The vibrator 25 is disposed at locations having an indivisible ratio, in the lateral direction and the vertical direction of the display cell 11, the display cell 61, the flat panel 17, or the flat panel 63. Examples of the "indivisible ratio" include 3:4, 5:7, 3:7, 2:5, and 7:11.

In the present modification example, of the back surface of the display cell 11, the display cell 61, the flat panel 17, or the flat panel 63, the position facing the vibrator 25 is set as the vibration point 11D. In this case, the vibration controlling member 16D partitions the back surface of the display cell 11, the display cell 61, the flat panel 17, or the flat panel 63 into the partition region R3 including the vibration point 11D, and is fixed to the back surface of the display cell 11, the display cell 61, the flat panel 17, or the flat panel 63.

In the present modification example, the vibration controlling member 16D has a function of preventing a stationary wave caused by vibration generated in the display cell 11, the display cell 61, the flat panel 17, or the flat panel 63 by the vibrator 25. The vibration controlling member 16D may be configured by, for example, a material allowed to control reflection in the sound wave region (20 Hz or more) with respect to the vibration generated by the vibrator 25. Further, the vibration controlling member 16D may be configured by, for example, a material allowed to absorb vibration or reverberation generated by the vibrator 25.

The vibration controlling member 16D may include, for example, a plurality of protrusions 16d (third protrusions) protruding toward the vibration point 11D, as illustrated in FIG. 36 and FIG. 38 to FIG. 40. The vibration controlling member 16D may include, for example, one protrusion 16d protruding toward the vibration point 11D, as illustrated in FIG. 37. The vibration controlling member 16D may be, for example, formed to have the partition region R3 being a closed region on the back surface of the display cell 11, the display cell 61, the flat panel 17, or the flat panel 63, as illustrated in FIG. 36 to FIG. 42. The vibration controlling member 16D may be, for example, shaped like a circular ring or a polygonal ring without having a location protruding toward the vibration point 11D, as illustrated in FIG. 41 and FIG. 42. It is to be noted that the vibration controlling member 16D may be disposed away from the surface of the inner plate 12, insofar as the vibration controlling member 16D has a function similar to the function of the vibration controlling member 16.

In the present modification example, the back surface of the display cell 11, the display cell 61, the flat panel 17, or the flat panel 63 is partitioned by the vibration controlling member 16D fixed to the back surface of the display cell 11, the display cell 61, the flat panel 17, or the flat panel 63, into the partition region R3 including the vibration point 11D. This prevents a stationary wave caused by vibration generated in the display cell 11, the display cell 61, the flat panel 17, or the flat panel 63 by the vibrator 25. As a result, it is possible to suppress a decline in sound quality. It is to be noted that the vibration controlling member 16D in the present modification example has effects similar to the effects obtained by the vibration controlling member 16 in the foregoing embodiments.

In the present modification example, the vibration controlling member 16D may be formed on substantially the entire back surface of the display cell 61, the flat panel 17, or the flat panel 63. For example, as illustrated in FIG. 43, in the present modification example, the vibration controlling member 16D may be formed in a wide range of the back surface of the display cell 61, the flat panel 17, or the flat panel 63.

Although the disclosure has been described above with reference to the embodiments and modification examples thereof, the disclosure is not limited to the foregoing embodiments and the like and may be modified in a variety of ways. It is to be noted that the effects described herein are merely exemplified. The effects of the disclosure are not limited to the effects described herein. The disclosure may have an effect other than the effects described herein.

It is to be noted that the disclosure may adopt the following configurations.

(1)
A flat panel speaker including:
a flat panel; and
a plurality of vibrators that are disposed on a back surface of the flat panel and cause the flat panel to vibrate,
the plurality of vibrators being disposed to avoid a location that most easily vibrates in an entire range of audio frequencies when vibration is generated in the flat panel by the plurality of vibrators.

(2)
The flat panel speaker according to (1), in which the plurality of vibrators are disposed to avoid a location that least easily vibrates in the entire range of audio frequencies when vibration is generated in the flat panel by the plurality of vibrators.

(3)
The flat panel speaker according to (1) or (2), in which the plurality of vibrators are disposed at locations having an indivisible ratio, in a lateral direction and a vertical direction of the flat panel.

(4)
The flat panel speaker according to any one of (1) to (3), including:
the flat panel;
the plurality of vibrators that are disposed on the back surface of the flat panel and cause the flat panel to vibrate; and
a vibration controlling member that is fixed to the back surface of the flat panel and partitions the back surface of the flat panel into a first partition region including a first vibration point and a second partition region including a second vibration point, when, on the back surface of the flat panel, a position facing a first vibrator among the plurality of vibrators is set as the first vibration point and a position facing a second vibrator, different from the first vibrator, among the plurality of vibrators is set as the second vibration point.

(5)
The flat panel speaker according to (4), in which the vibration controlling member has a function of preventing a stationary wave caused by interference between vibration generated in the flat panel by the first vibrator and vibration generated in the flat panel by the second vibrator.

(6)
The flat panel speaker according to (4) or (5), in which
the vibration controlling member includes a first vibration controlling member that forms the first partition region and a second vibration controlling member that forms the second partition region,
the first vibration controlling member includes one or more first protrusions protruding toward the first vibration point, and
the second vibration controlling member includes one or more second protrusions protruding toward the second vibration point.

(7)
The flat panel speaker according to (6), in which
the first partition region is disposed near a left edge of the flat panel,
the second partition region is disposed near a right edge of the flat panel,
the one or more first protrusions are disposed near the left edge of the flat panel in the first partition region, and
the one or more second protrusions are disposed near the right edge of the flat panel in the second partition region.

(8)
The flat panel speaker according to any one of (5) to (7), in which
the first partition region has an aspect ratio different from 1:1, and
the second partition region has an aspect ratio different from 1:1.

(9)
The flat panel speaker according to any one of (4) to (8), in which the vibration controlling member is configured by a flexible member that is poor in self-supporting, the vibration controlling member including a sponge as the flexible member and further including an adhesive layer or a bonding layer that fixes the sponge to the back surface of the flat panel.

(10)

The flat panel speaker according to any one of (4) to (8), in which the vibration controlling member is configured by a flexible member that is poor in self-supporting, the vibration controlling member including an adhesive or a bond as the flexible member.

(11)

The flat panel speaker according to (5), further including a facing plate that is disposed to face the flat panel with a predetermined clearance formed therebetween, each of the vibrators being fixed to the facing plate.

(12)

The flat panel speaker according to (11), in which the vibration controlling member is in contact with the facing plate.

(13)

The flat panel speaker according to (11), in which the vibration controlling member is disposed away from the facing plate.

(14)

The flat panel speaker according to (5), in which each of the vibrators is fixed at a position different from a position facing the vibrator, with respect to the back surface of the flat panel.

(15)

A flat panel speaker including:

a flat panel; and a vibrator that is disposed on a back surface of the flat panel and causes the flat panel to vibrate, the vibrator being disposed to avoid a location that most easily vibrates in an entire range of audio frequencies when vibration is generated in the flat panel by the vibrator.

(16)

The flat panel speaker according to (15), further including a vibration controlling member that is fixed to a back surface of the display cell and partitions the back surface of the display cell into a partition region including a vibration point, when a position facing the vibrator is set as the vibration point, on the back surface of the display cell.

(17)

The flat panel speaker according to (16), in which the vibration controlling member has a function of preventing a stationary wave caused by vibration generated in the flat panel by the vibrator.

(18)

A display unit including:

a display cell that is shaped like a thin plate and displays an image; and a plurality of vibrators that are disposed on a back surface of the display cell and cause the display cell to vibrate, the plurality of vibrators being disposed to avoid a location that most easily vibrates in an entire range of audio frequencies when vibration is generated in the display cell by the plurality of vibrators.

(19)

A display unit including:

a display cell that is shaped like a thin plate and displays an image; and a vibrator that is disposed on a back surface of the display cell and causes the display cell to vibrate, the vibrator being disposed to avoid a location that most easily vibrates in an entire range of audio frequencies when vibration is generated in the display cell by the vibrator.

This application claims the benefit of Japanese Priority Patent Application JP2016-253665 filed with the Japan Patent Office on Dec. 27, 2016 and Japanese Patent Application JP2017-099449 filed with the Japan Patent Office on May 19, 2017, the entire contents of both of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A flat panel speaker comprising:

a flat panel; and a plurality of vibrators that are disposed on a back surface of the flat panel and cause the flat panel to vibrate, the plurality of vibrators being disposed at locations having a lateral coordinate along a lateral direction and a vertical coordinate along a vertical direction of the flat panel; and a vibration controlling member fixed to the back surface of the flat panel and that partitions the back surface of the flat panel into a first closed partition region including a first vibration point and a second closed partition region including a second vibration point, the vibration controlling member includes a first vibration controlling member that forms the first closed partition region and a second vibration controlling member that forms the second closed partition region, wherein the first closed partition region and the second closed partition region are positioned vertically symmetrical relative to a vertical central axis extending along the vertical direction or the first closed partition region and the second closed partition region are positioned laterally symmetrical relative to a lateral central axis extending along the lateral direction.

2. The flat panel speaker according to claim 1, wherein the plurality of vibrators are disposed to avoid a location of a node of a minimum stationary wave in the entire range of audio frequencies when vibration is generated in the flat panel by the plurality of vibrators.

3. The flat panel speaker according to claim 1, wherein, on the back surface of the flat panel, a position facing a first vibrator among the plurality of vibrators is set as the first vibration point and a position facing a second vibrator, different from the first vibrator, among the plurality of vibrators is set as the second vibration point.

4. The flat panel speaker according to claim 3, wherein the vibration controlling member has a function of preventing a stationary wave caused by interference between vibration generated in the flat panel by the first vibrator and vibration generated in the flat panel by the second vibrator.

5. The flat panel speaker according to claim 4, wherein the first partition region has an aspect ratio different from 1:1, and the second partition region has an aspect ratio different from 1:1.

6. The flat panel speaker according to claim 4, further comprising a facing plate that is disposed to face the flat panel with a predetermined clearance formed therebetween, each of the vibrators being fixed to the facing plate.

7. The flat panel speaker according to claim 6, wherein the vibration controlling member is in contact with the facing plate.

8. The flat panel speaker according to claim 6, wherein the vibration controlling member is disposed away from the facing plate.

9. The flat panel speaker according to claim 3, wherein the first vibration controlling member includes one or more first protrusions protruding toward the first vibration point, and the second vibration controlling member includes one or more second protrusions protruding toward the second vibration point.

10. The flat panel speaker according to claim 9, wherein
the first closed partition region is disposed near a left edge of the flat panel,
the second closed partition region is disposed near a right edge of the flat panel,
the one or more first protrusions are disposed near the left edge of the flat panel in the first closed partition region, and
the one or more second protrusions are disposed near the right edge of the flat panel in the second closed partition region.

11. The flat panel speaker according to claim 3, wherein the vibration controlling member is configured by a flexible member, the vibration controlling member including a sponge as the flexible member and further including an adhesive layer or a bonding layer that fixes the sponge to the back surface of the flat panel.

12. The flat panel speaker according to claim 3, wherein the vibration controlling member is configured by a flexible member, the vibration controlling member including an adhesive or a bond as the flexible member.

13. A flat panel speaker comprising:
a flat panel;
a vibrator that is disposed on a back surface of the flat panel and causes the flat panel to vibrate, the vibrator being disposed at a location having a lateral coordinate along a lateral direction and a vertical coordinate along a vertical direction of the flat panel; and
a vibration controlling member fixed to the back surface of the flat panel and that partitions the back surface of the flat panel into a first closed partition region including a first vibration point and a second closed partition region including a second vibration point,
the vibration controlling member includes a first vibration controlling member that forms the first closed partition region and a second vibration controlling member that forms the second closed partition region, wherein the first closed partition region and the second closed partition region are positioned vertically symmetrical relative to a vertical central axis extending along the vertical direction or the first closed partition region and the second closed partition region are positioned laterally symmetrical relative to a lateral central axis extending along the lateral direction.

14. The flat panel speaker according to claim 13, wherein the vibration controlling member has a function of preventing a stationary wave caused by vibration generated in the flat panel by the vibrator.

15. The flat panel speaker according to claim 13, wherein the vibrator is disposed to avoid a location of an anti-node of a maximum stationary wave in an entire range of audio frequencies when vibration is generated in the flat panel by the vibrator.

16. A display unit comprising:
a display cell that is shaped like a thin plate and displays an image;
a plurality of vibrators that are disposed on a back surface of the display cell and cause the display cell to vibrate, the plurality of vibrators are disposed at locations having a lateral coordinate along a lateral direction and a vertical coordinate along a vertical direction of the flat panel such that the ratio of the lateral coordinate and the vertical coordinate is indivisible; and
a vibration controlling member that is fixed to the back surface of the flat panel and that partitions the back surface of the flat panel into a first closed partition region including a first vibration point and a second closed partition region including a second vibration point,
the vibration controlling member includes a first vibration controlling member that forms the first closed partition region and a second vibration controlling member that forms the second closed partition region, wherein the first closed partition region and the second closed partition region are positioned vertically symmetrical relative to a vertical central axis extending along the vertical direction or the first closed partition region and the second closed partition region are positioned laterally symmetrical relative to a lateral central axis extending along the lateral direction.

17. A display unit comprising:
a display cell that is shaped like a thin plate and displays an image;
a vibrator that is disposed on a back surface of the display cell and causes the display cell to vibrate, the vibrator being disposed at a location having a lateral coordinate along a lateral direction and a vertical coordinate along a vertical direction of the flat panel such that the ratio of the lateral coordinate and the vertical coordinate is indivisible; and
a vibration controlling member that is fixed to the back surface of the flat panel and that partitions the back surface of the flat panel into a first closed partition region including a first vibration point and a second closed partition region including a second vibration point,
the vibration controlling member includes a first vibration controlling member that forms the first closed partition region and a second vibration controlling member that forms the second closed partition region, wherein the first closed partition region and the second closed partition region are positioned vertically symmetrical relative to a vertical central axis extending along the vertical direction or the first closed partition region and the second closed partition region are positioned laterally symmetrical relative to a lateral central axis extending along the lateral direction.

18. The display unit according to claim 17, wherein the vibrator is disposed to avoid a location of an anti-node of a maximum stationary wave in an entire range of audio frequencies when vibration is generated in the flat panel by the vibrator.

* * * * *